(12) United States Patent
Hattori

(10) Patent No.: US 10,165,304 B2
(45) Date of Patent: Dec. 25, 2018

(54) IMAGE ENCODING APPARATUS, IMAGE ENCODING METHOD, IMAGE DECODING APPARATUS, IMAGE DECODING METHOD, PROGRAM, AND STORAGE MEDIUM

(71) Applicant: CANON KABUSHIKI KAISHA, Tokyo (JP)

(72) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/248,730

(22) Filed: Aug. 26, 2016

(65) Prior Publication Data

US 2016/0366440 A1 Dec. 15, 2016

Related U.S. Application Data

(63) Continuation of application No. 14/356,550, filed as application No. PCT/JP2012/078083 on Oct. 24, 2012, now Pat. No. 9,462,269.

(30) Foreign Application Priority Data

Nov. 7, 2011 (JP) ................................ 2011-243939

(51) Int. Cl.
| | |
|---|---|
| *G06K 9/00* | (2006.01) |
| *H04N 19/593* | (2014.01) |
| *G06K 15/02* | (2006.01) |
| *H04N 19/119* | (2014.01) |
| *H04N 19/436* | (2014.01) |

(Continued)

(52) U.S. Cl.
CPC ....... *H04N 19/593* (2014.11); *G06K 15/1836* (2013.01); *H04N 19/119* (2014.11); *H04N 19/176* (2014.11); *H04N 19/436* (2014.11); *H04N 19/44* (2014.11); *H04N 19/127* (2014.11);

(Continued)

(58) Field of Classification Search
CPC .... H04N 19/176; H04N 19/593; H04N 19/61; H04N 19/119; H04N 19/52; H04N 19/11; H04N 19/159; H04N 19/174; H04N 19/129; H04N 19/33; H04N 19/50

See application file for complete search history.

(56) References Cited

U.S. PATENT DOCUMENTS 8,837,577 B2 * 9/2014 Segall .............. H04N 19/00927
375/240
9,769,474 B2 * 9/2017 Lai ....................... H04N 19/593

(Continued)

*Primary Examiner* — Bhavesh M Mehta
*Assistant Examiner* — Ian L Lemieux
(74) *Attorney, Agent, or Firm* — Canon USA, Inc. I.P. Division

(57) ABSTRACT

An image encoding apparatus includes a calculation unit configured to calculate a profile indicating a combination of processes which can be decoded by an image decoding apparatus and a level indicating a range of a parameter value which can be decoded by the image decoding apparatus, a determination unit configured to determine a number of horizontal pixels of a tile or a number of horizontal tiles with respect to a specific profile to be N or smaller (N>0) which is a maximum number of horizontal pixels defined in advance according to the level, and to determine a number of vertical pixels of the tile or a number of vertical tiles with respect to the specific profile to be M or smaller (M>0) which is a maximum number of vertical pixels defined in advance according to the level.

3 Claims, 21 Drawing Sheets

(51) Int. Cl.
*H04N 19/176* (2014.01)
*H04N 19/44* (2014.01)
*H04N 19/70* (2014.01)
*H04N 19/127* (2014.01)
*H04N 19/162* (2014.01)

(52) U.S. Cl.
CPC ............ *H04N 19/162* (2014.11); *H04N 19/70* (2014.11); *H04N 2201/3243* (2013.01)

(56) References Cited

U.S. PATENT DOCUMENTS

| | | | |
|---|---|---|---|
| 2008/0267290 A1* | 10/2008 | Barbieri | H04N 19/61 375/240.13 |
| 2010/0232504 A1* | 9/2010 | Feng | H04N 19/176 375/240.13 |
| 2012/0014437 A1* | 1/2012 | Segall | H04N 19/00884 375/240.12 |
| 2015/0172693 A1* | 6/2015 | Yang | H04N 19/119 375/240.26 |
| 2015/0172716 A1* | 6/2015 | Chen | H04N 19/105 375/240.02 |

* cited by examiner

| PROFILE / LEVEL | BASELINE PROFILE | | | | PRINTING PROFILE | | | |
|---|---|---|---|---|---|---|---|---|
| | FRAME MAXIMUM HORIZONTAL SIZE (PIXELS) | FRAME MAXIMUM VERTICAL SIZE (PIXELS) | TILE MAXIMUM HORIZONTAL SIZE Max Tile Width (PIXELS) | TILE MAXIMUM VERTICAL SIZE Max Tile Height (PIXELS) | FRAME MAXIMUM HORIZONTAL SIZE (PIXELS) | FRAME MAXIMUM VERTICAL SIZE (PIXELS) | TILE MAXIMUM HORIZONTAL SIZE Max Tile Width (PIXELS) | TILE MAXIMUM VERTICAL SIZE Max Tile Height (PIXELS) |
| LEVEL 1 (LOW LEVEL) | 640 | 480 | NO LIMITATION | NO LIMITATION | 640 | 480 | 320 | NO LIMITATION |
| LEVEL 2 (MIDDLE LEVEL) | 1920 | 1088 | NO LIMITATION | NO LIMITATION | 1920 | 1088 | 480 | 640 |
| LEVEL 3 (HIGH LEVEL) | 4096 | 2160 | NO LIMITATION | NO LIMITATION | 4096 | 2160 | 960 | 1280 |
| LEVEL 4 (SUPER HIGH LEVEL) | 8192 | 4320 | NO LIMITATION | NO LIMITATION | 8192 | 4320 | 960 | 2560 |

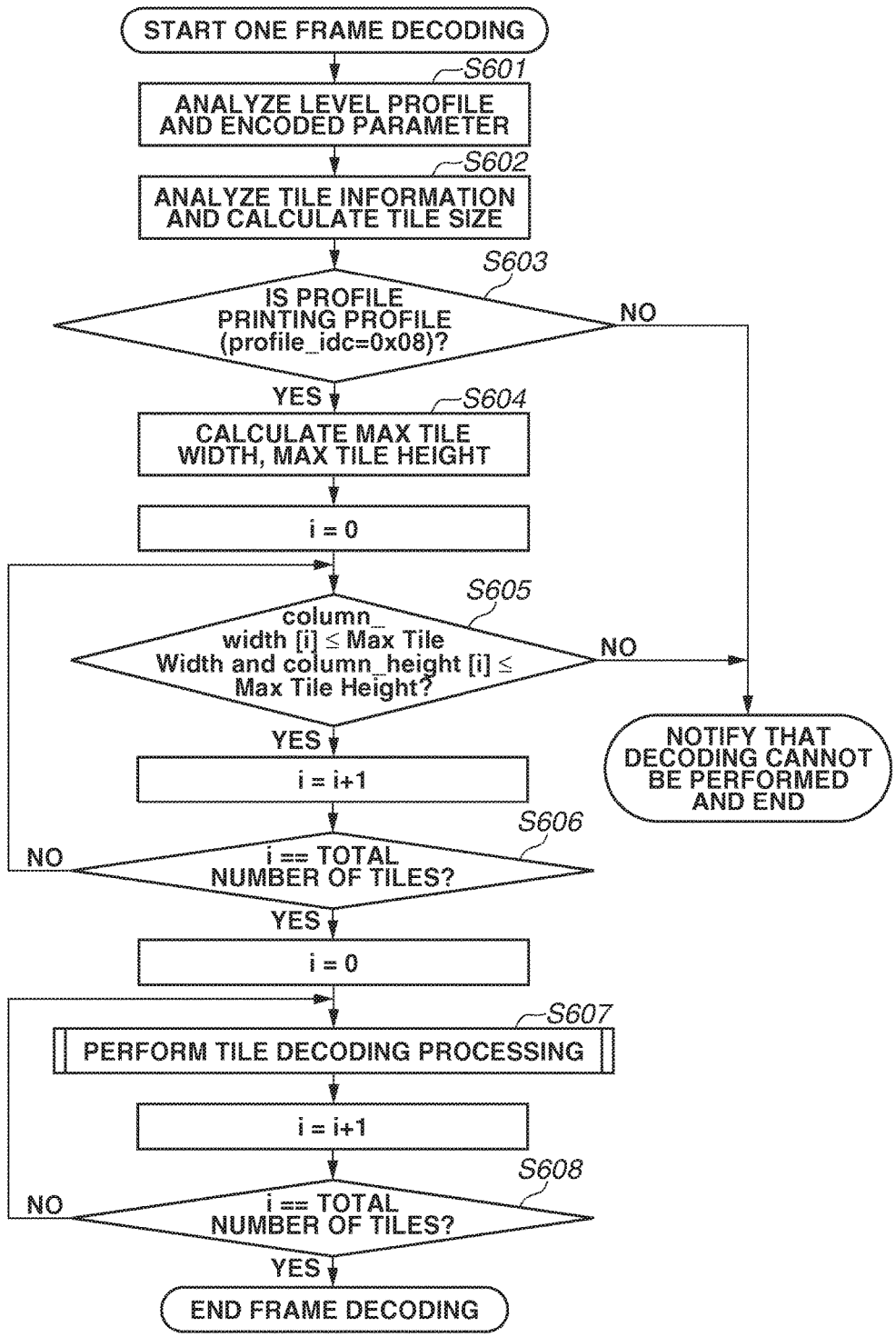

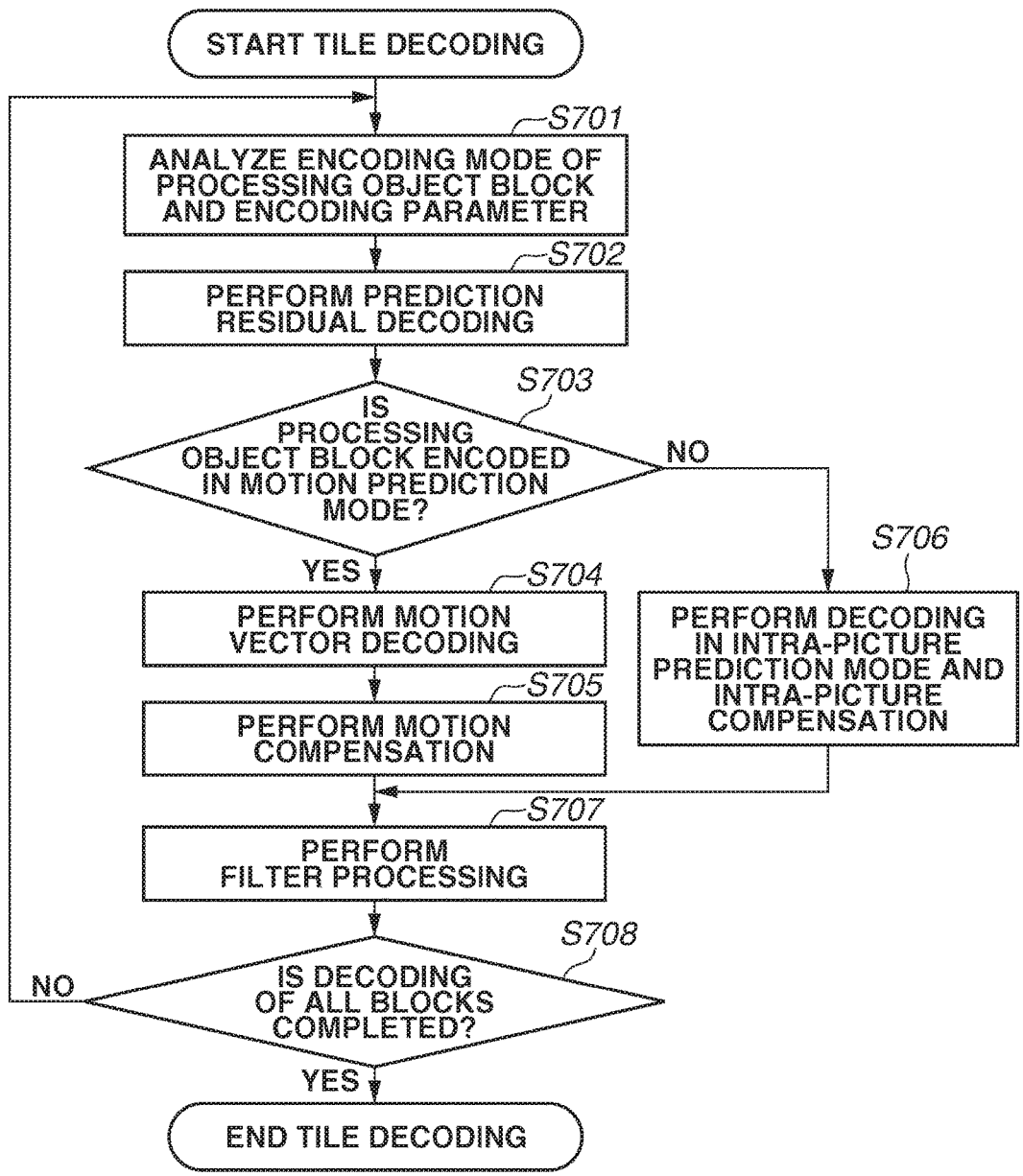

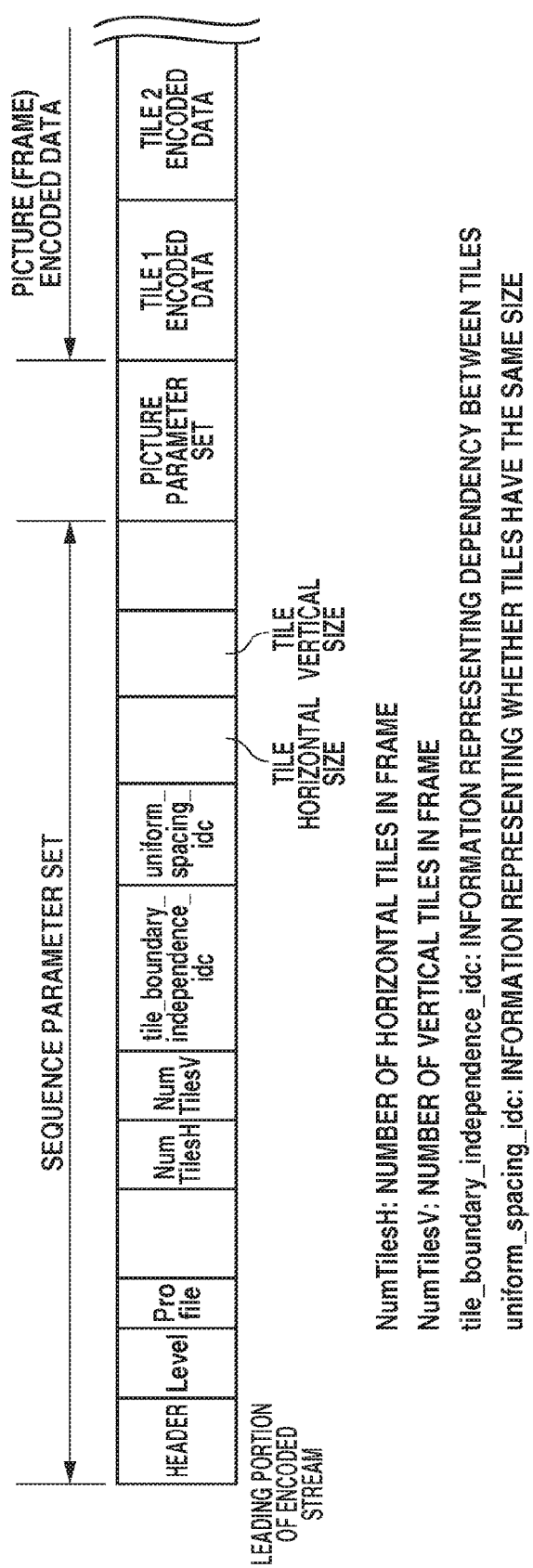

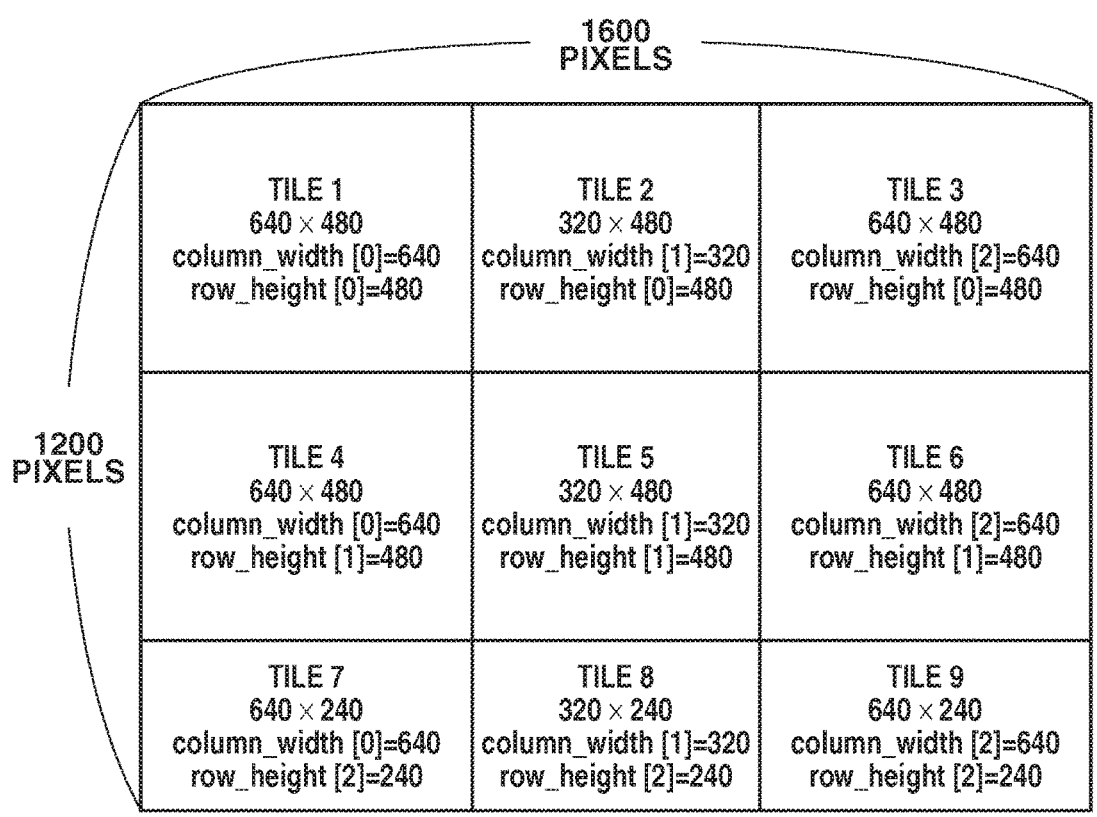

FIG.10

| PROFILE | BASELINE PROFILE | | | PRINTING PROFILE | | |
|---|---|---|---|---|---|---|
| LEVEL | FRAME MAXIMUM HORIZONTAL SIZE (PIXELS) | FRAME MAXIMUM VERTICAL SIZE (PIXELS) | TOTAL MAXIMUM NUMBER OF PIXELS OF TILE Max Tile Size (PIXELS) | FRAME MAXIMUM HORIZONTAL SIZE (PIXELS) | FRAME MAXIMUM VERTICAL SIZE (PIXELS) | TOTAL MAXIMUM NUMBER OF PIXELS OF TILE Max Tile Size (PIXELS) |
| LEVEL 1 (LOW LEVEL) | 640 | 480 | NO LIMITATION | 640 | 480 | 153600 |
| LEVEL 2 (MIDDLE LEVEL) | 1920 | 1088 | NO LIMITATION | 1920 | 1088 | 307200 |
| LEVEL 3 (HIGH LEVEL) | 4096 | 2160 | NO LIMITATION | 4096 | 2160 | 1228800 |
| LEVEL 4 (SUPER HIGH LEVEL) | 8192 | 4320 | NO LIMITATION | 8192 | 4320 | 2457600 |

FIG.11A

| PROFILE / LEVEL | BASELINE PROFILE | | | | PRINTING PROFILE | | | |
|---|---|---|---|---|---|---|---|---|
| | FRAME MAXIMUM HORIZONTAL SIZE (PIXELS) | FRAME MAXIMUM VERTICAL SIZE (PIXELS) | USED TILE HORIZONTAL SIZE (PIXELS) | USED TILE VERTICAL SIZE (PIXELS) | FRAME MAXIMUM HORIZONTAL SIZE (PIXELS) | FRAME MAXIMUM VERTICAL SIZE (PIXELS) | TILE MAXIMUM HORIZONTAL SIZE Max Tile Width (PIXELS) | TILE MAXIMUM VERTICAL SIZE Max Tile Height (PIXELS) |
| LEVEL 1 (LOW LEVEL) | 640 | 480 | NO-DIVISION OF TILE | NO-DIVISION OF TILE | 640 | 480 | 320 | NO LIMITATION |
| LEVEL 2 (MIDDLE LEVEL) | 1920 | 1088 | NO-DIVISION OF TILE | NO-DIVISION OF TILE | 1920 | 1088 | 480 | 640 |
| LEVEL 3 (HIGH LEVEL) | 4096 | 2160 | NO-DIVISION OF TILE | NO-DIVISION OF TILE | 4096 | 2160 | 960 | 1280 |
| LEVEL 4 (SUPER HIGH LEVEL) | 8192 | 4320 | NO-DIVISION OF TILE | NO-DIVISION OF TILE | 8192 | 4320 | 960 | 2560 |

FIG.11B

| PROFILE LEVEL | BASELINE PROFILE | | | | PRINTING PROFILE HIGH PRINTING PROFILE | | |
|---|---|---|---|---|---|---|---|
| | FRAME MAXIMUM HORIZONTAL SIZE (PIXELS) | FRAME MAXIMUM VERTICAL SIZE (PIXELS) | USED TILE HORIZONTAL SIZE (PIXELS) | USED TILE VERTICAL SIZE (PIXELS) | FRAME MAXIMUM HORIZONTAL SIZE (PIXELS) | FRAME MAXIMUM VERTICAL SIZE (PIXELS) | TOTAL MAXIMUM NUMBER OF PIXELS OF TILE Max Tile Size (PIXELS) |
| LEVEL 1 (LOW LEVEL) | 640 | 480 | NO-DIVISION OF TILE | NO-DIVISION OF TILE | 640 | 480 | 153600 |
| LEVEL 2 (MIDDLE LEVEL) | 1920 | 1088 | NO-DIVISION OF TILE | NO-DIVISION OF TILE | 1920 | 1088 | 307200 |
| LEVEL 3 (HIGH LEVEL) | 4096 | 2160 | NO-DIVISION OF TILE | NO-DIVISION OF TILE | 4096 | 2160 | 1228800 |
| LEVEL 4 (SUPER HIGH LEVEL) | 8192 | 4320 | NO-DIVISION OF TILE | NO-DIVISION OF TILE | 8192 | 4320 | 2457600 |

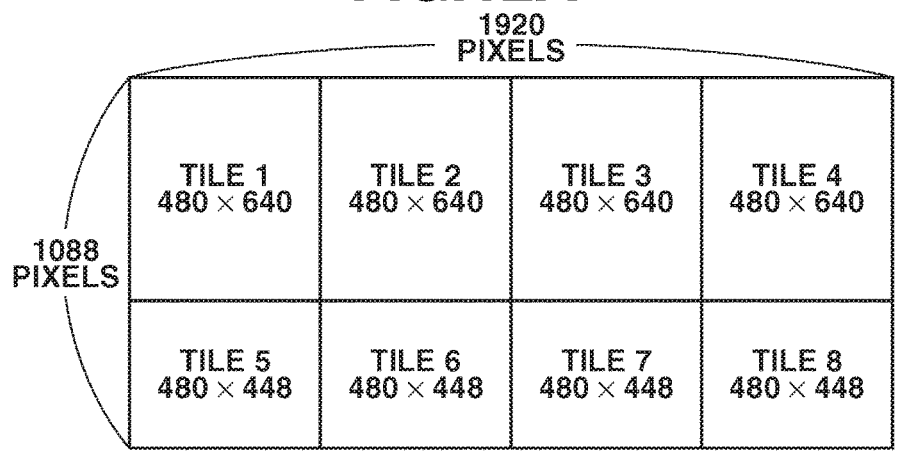
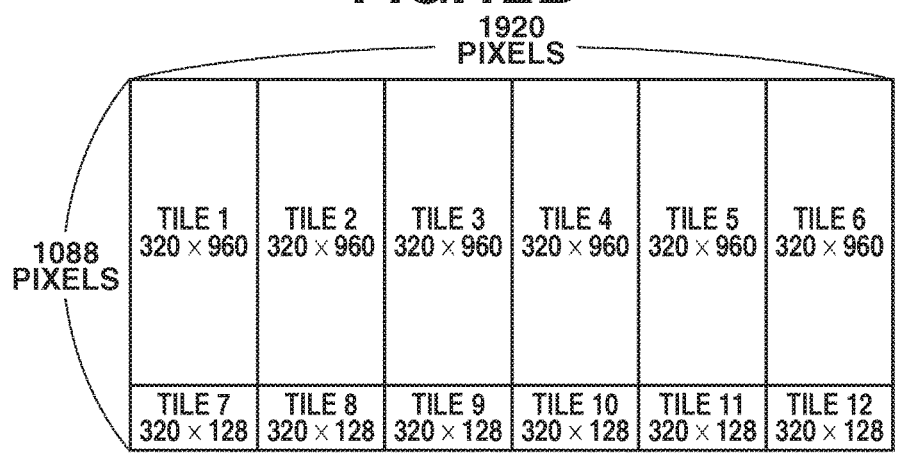
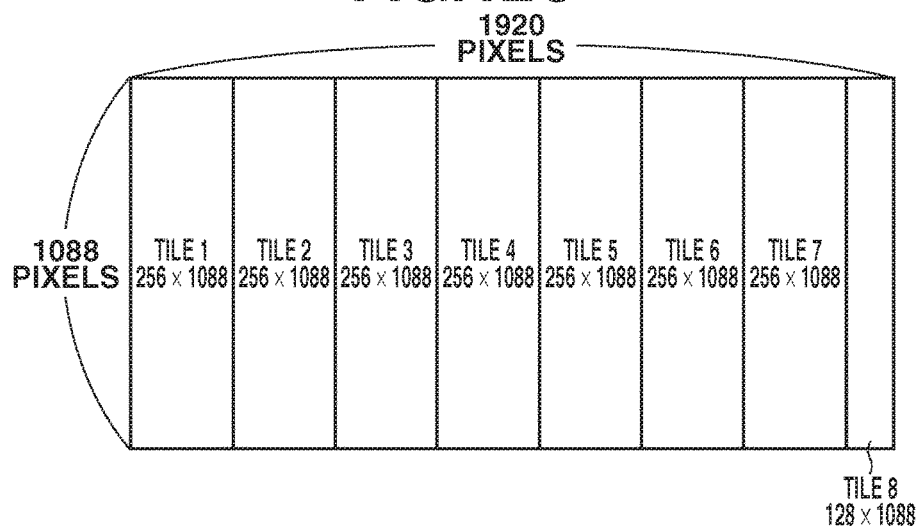

FIG. 13

| PROFILE / LEVEL | BASELINE PROFILE | | | | PRINTING PROFILE | | | | |
|---|---|---|---|---|---|---|---|---|---|
| | FRAME MAXIMUM HORIZONTAL SIZE (PIXELS) | FRAME MAXIMUM VERTICAL SIZE (PIXELS) | USED TILE HORIZONTAL SIZE (PIXELS) | USED TILE VERTICAL SIZE (PIXELS) | FRAME MAXIMUM HORIZONTAL SIZE (PIXELS) | FRAME MAXIMUM VERTICAL SIZE (PIXELS) | TILE MAXIMUM HORIZONTAL SIZE Max Tile Width (PIXELS) | TILE MAXIMUM VERTICAL SIZE Max Tile Height (PIXELS) | USED TILE HORIZONTAL SIZE (DEFAULT VALUE) (PIXELS) | USED TILE VERTICAL SIZE (DEFAULT VALUE) (PIXELS) |
| LEVEL 1 (LOW LEVEL) | 640 | 480 | NO-DIVISION OF TILE | NO-DIVISION OF TILE | 640 | 480 | 320 | 480 | 160 | 240 |
| LEVEL 2 (MIDDLE LEVEL) | 1920 | 1088 | NO-DIVISION OF TILE | NO-DIVISION OF TILE | 1920 | 1088 | 480 | 640 | 240 | 320 |
| LEVEL 3 (HIGH LEVEL) | 4096 | 2160 | NO-DIVISION OF TILE | NO-DIVISION OF TILE | 4096 | 2160 | 960 | 1280 | 480 | 640 |
| LEVEL 4 (SUPER HIGH LEVEL) | 8192 | 4320 | NO-DIVISION OF TILE | NO-DIVISION OF TILE | 8192 | 4320 | 960 | 2560 | 480 | 1280 |

FIG.15

| TYPE OF PRINTING PROFILE | TILE INFORMATION | | |
|---|---|---|---|
| | tile_info_present_flag | uniform_spacing_idc | TILE SIZE |
| TYPE 1 | 1 | 1 | LIMITATION BY MAXIMUM NUMBER OF HORIZONTAL PIXELS OF TILE AND MAXIMUM NUMBER OF VERTICAL PIXELS OF TILE |
| | 1 | 0 | |
| | 0 | NO INSERTION | USE MAXIMUM NUMBER OF HORIZONTAL PIXELS OF TILE AND MAXIMUM NUMBER OF VERTICAL PIXELS OF TILE AS TILE SIZE |
| TYPE 2 | 1 | 1 | LIMITATION BY TOTAL MAXIMUM NUMBER OF PIXELS OF TILE |
| | 1 | 0 | |
| | 0 | NO INSERTION | USE TILE SIZE DETERMINED ACCORDING TO ASPECT RATIO ESTIMATED FROM TOTAL MAXIMUM NUMBER OF PIXELS OF TILE |
| TYPE 3 | 1 | 1 | SAME AS TYPE 1 |
| | 1 | 0 | |
| | 0 | NO INSERTION | USE DEFAULT NUMBER OF HORIZONTAL PIXELS OF TILE AND DEFAULT NUMBER OF VERTICAL PIXELS OF TILE AS TILE SIZE |
| TYPE 4 | 1 | 1 | SAME AS TYPE 2 |
| | 1 | 0 | |
| | 0 | NO INSERTION | USE TILE SIZE DETERMINED ACCORDING TO ASPECT RATIO ESTIMATED FROM DEFAULT TOTAL NUMBER OF PIXELS OF TILE |

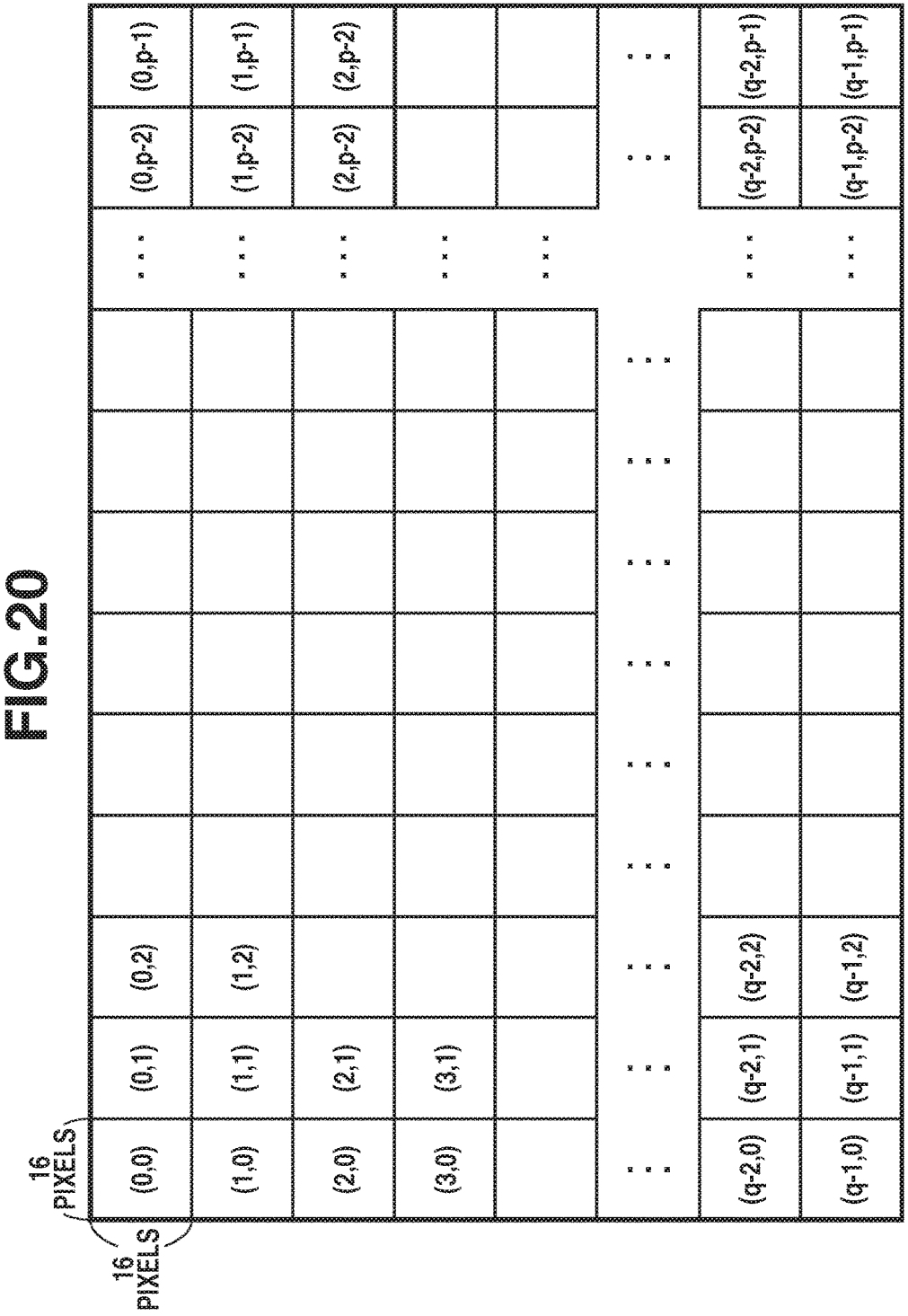

IMAGE ENCODING APPARATUS, IMAGE ENCODING METHOD, IMAGE DECODING APPARATUS, IMAGE DECODING METHOD, PROGRAM, AND STORAGE MEDIUM

CROSS-REFERENCE TO RELATED APPLICATIONS

This application is a continuation, and claims the benefit, of U.S. patent application Ser. No. 14/356,550, presently pending and filed on May 6, 2014, which is a national phase application of International Patent Application No. PCT/JP2012/078083, filed on Oct. 24, 2012, which applications are hereby incorporated by reference herein in their entireties, and this application claims the benefit of, and priority to, Japanese Patent Application No. 2011-243939 filed Nov. 7, 2011, which applications are hereby incorporated by reference herein in their entireties.

TECHNICAL FIELD

The present invention relates to an image encoding apparatus, an image encoding method, an image decoding apparatus, an image decoding method, a program, and a storage medium, and particularly to, an encoding method and a decoding method for an image of which frames are divided into rectangular tiles.

BACKGROUND ART

At present, in the development of digital technology, digital cameras and digital video cameras capable of performing high resolution digital moving image capturing have been widely spread. In addition to the implementation of the high resolution digital moving picture, user's demands for extracting a user's preferential frame from the captured moving picture and printing the frame as a still image has also been increased simultaneously. The process of extracting the frame from the moving picture and printing the frame is called "moving picture frame printing" according to the present invention.

The digital moving image is generally compressed (encoded) to efficiently record the digital moving image in a recording medium represented by a flash memory, and H.264/MPEG-4AVC (hereinafter, referred to as H.264) has been widely used as the moving image encoding method. (ITU-T H.264 (03/2010) Advanced video coding for generic audio visual services)

The processing order of the macroblock in H.264 is illustrated in FIGS. 19A and 19B. As illustrated in FIG. 19A, one frame is divided in a unit of a macroblock configured with (16 pixels)×(16 pixels), and the encoding process is performed. The encoding is performed in the order of the upper left macroblock, the upper right macroblock, the lower left macroblock, and the lower right macroblock in the frame. In the decoding process, the decoding is performed in the same processing order as that of the encoding process, and the decoded image is output.

In addition, a multi-slice structure where one frame is divided into a plurality of slices is employed to improve error tolerance or the like in H.264. The slice is configured with one or more macroblocks. FIG. 19B illustrates the multi-slice structure, the order of encoding, and the order of decoding.

Recently, the international standardization of more efficient encoding methods as a successor of H.264 has been started, and Joint Collaborative Team on Video Coding (JCT-VC) is established between ISO/IEC and ITU-T. In the JCT-VC, standardization of the encoding method of High Efficiency Video Coding (hereinafter, referred to as HEVC) has been advanced.

In the standardization of HEVC, various encoding methods are widely studied in terms of improvement of the encoding efficiency, easiness of the mounting, and reduction of the processing time. Among them, there is a method called Tile which enables parallel processing of encoding and decoding. (Contributed to JCT-VC, JCTVC-F335.doc Internet<http://phenix.int-evry.fr/jct/doc_end_user/documents/6_Torino/wg11/>) If the Tile is used, due to the parallel processing of the encoding and the decoding, it is possible to implement a high speed process and to reduce the memory capacity of the encoding apparatus and the decoding apparatus.

In general, similar to full high vision of (horizontal 1920 pixels)×(vertical 1080 pixels), a longitudinally-wide frame is used for digital moving picture. On the other hand, in the use case of the moving picture frame printing, mainly due to apparatus limitation of a main body of a printer, the printing of the longitudinally-wide frame is generally performed in the horizontal direction (in the direction from the pixel column of the left end to the right end) in a unit of a vertical pixel column of the frame.

FIG. 20 illustrates a processing order of image output for the decoding and the printing process in the moving picture frame printing. FIG. 20 illustrates a frame configured with p macroblocks in the horizontal direction and q macroblocks in the vertical direction. In FIG. 20, the numbers indicate space coordinates of each macroblock. As described above, the decoding process in the H.264 is performed in the raster scan order in a unit of a macroblock.

In FIG. 20, the process is performed in the order of (0, 0)→(0, 1)→(0, 2)→ . . . →(0, p−1)→(1, 0)→(1, 1)→ . . . →(1, p−1)→(2, 0)→ . . . → (q−1, 0)→ . . . →(q−1, p−1).

On the other hand, in the printing process of the moving picture frame printing, the left-end macroblock column of (0, 0) to (q−1, 0) is a firstly needed area. Next, the macroblock columns of (0, 1) to (q−1, 1) and (0, 2) to (q−1, 2) are sequentially needed. The order is different from the processing order of the decoding.

CITATION LIST

Patent Literature

PTL 1 Japanese Patent Application Laid-Open No. 2009-194748

Non Patent Literature

NPL 1 Contributed to JCT-VC, JCTVC-F335.doc Internet<http://phenix.int-evry.fr/jct/doc_end_user/documents/6_Torino/wg11/>

SUMMARY OF INVENTION

Technical Problem

In the decoding process of H.264, the decoding of the macroblock of (q−1, 0) is completed just before the process of one frame is completed. In the printing process, the output pixel may not be obtained until the decoding process of one frame is substantially completed.

In this manner, in the use case where the output image is needed in the processing order different from the moving picture decoding process similar to the moving picture frame printing, the printing process needs to wait for the completion of the decoding process of almost all the portions of the processing-object frame. The waiting time causes the increase in the processing time of the moving picture frame printing, so that there is an issue in that the user convenience is lost.

In addition, as described above, since the printing process waits for the completion of the decoding of one frame, the entire decoded frame needs to be stored in the memory. When the main body of the printer performs the decoding process of the moving picture in H.264 or the like, an additional memory area is needed, so that there is an issue in that the cost of the main body of the printer is increased.

Therefore, with respect to the memory size which is limited in the printer discussed in PTL 1, when output in the processing order different from that of the decoding process is needed, a method of decoding the encoded image file several times is discussed. However, since the compressed file is decoded several times, the processing time is increased, so that the issue of the increase in the processing time may not be sufficiently solved.

Solution to Problem

The present invention is directed to an image encoding apparatus, an image decoding apparatus capable of implementing a higher speed process and reducing memory cost in the use case where a processing order of decoding is different from a processing order of the pixel output similarly to moving picture frame printing.

According to an aspect of the present invention, an image encoding apparatus configured to divide each frame of one or more image frames into a plurality of rectangular tiles and to encode each tile includes a calculation unit configured to calculate a profile indicating a combination of processes which can be decoded by an image decoding apparatus and a level indicating a range of a parameter value which can be decoded by the image decoding apparatus, a determination unit configured to determine a number of horizontal pixels of a tile or a number of horizontal tiles with respect to a specific profile to be N or smaller (N>0) which is a maximum number of horizontal pixels defined in advance according to the level, and to determine a number of vertical pixels of the tile or a number of vertical tiles with respect to the specific profile to be M or smaller (M>0) which is a maximum number of vertical pixels defined in advance according to the level, and an encoding unit configured to divide each frame according to the determined number of horizontal pixels and number of vertical pixels of the tile or the number of tiles, and to perform encoding of the divided frame.

Advantageous Effects of Invention

According to the present invention, even in the use case where an output image is needed in a processing order different from the processing order of the moving picture decoding, a pixel output process can start without waiting for completion of a decoding process, so that it is possible to shorten a processing time. In addition, since an output memory does not necessarily store the entire frames, a size of the memory is reduced, so that the cost can be reduced. In addition, since a maximum tile size is defined according to a profile, a maximum processing time and a maximum memory size needed during decoding can be defined as more desirable values.

Further features and aspects of the present invention will become apparent from the following detailed description of exemplary embodiments with reference to the attached drawings.

BRIEF DESCRIPTION OF DRAWINGS

FIG. 2 is a diagram illustrating an example of tile division according to the first exemplary embodiment.

FIG. 5 is a table illustrating limitation of tile sizes according to the first exemplary embodiment.

FIG. 6 is a flowchart illustrating decoding of each frame according to a second exemplary embodiment.

FIG. 7 is a flowchart illustrating decoding of each tile according to the second exemplary embodiment.

FIG. 8 is a diagram illustrating an example of an encoded stream according to a third exemplary embodiment.

FIG. 9 is a diagram illustrating an example of tile division according to the third exemplary embodiment.

FIG. 10 is a table illustrating limitation of tile sizes according to the third exemplary embodiment.

FIGS. 11A and 11B are tables illustrating limitation of tile size according to a fourth exemplary embodiment.

FIGS. 12A, 12B, and 12C are diagrams illustrating tile division according to the fourth exemplary embodiment.

FIG. 13 is a table illustrating limitation of tile sizes according to a fifth exemplary embodiment.

FIG. 15 is a table illustrating a list of different types of printing profiles which can be used in the present invention.

FIG. 20 is a diagram illustrating positions of macroblocks in H.264.

DESCRIPTION OF EMBODIMENTS

Figure 1:
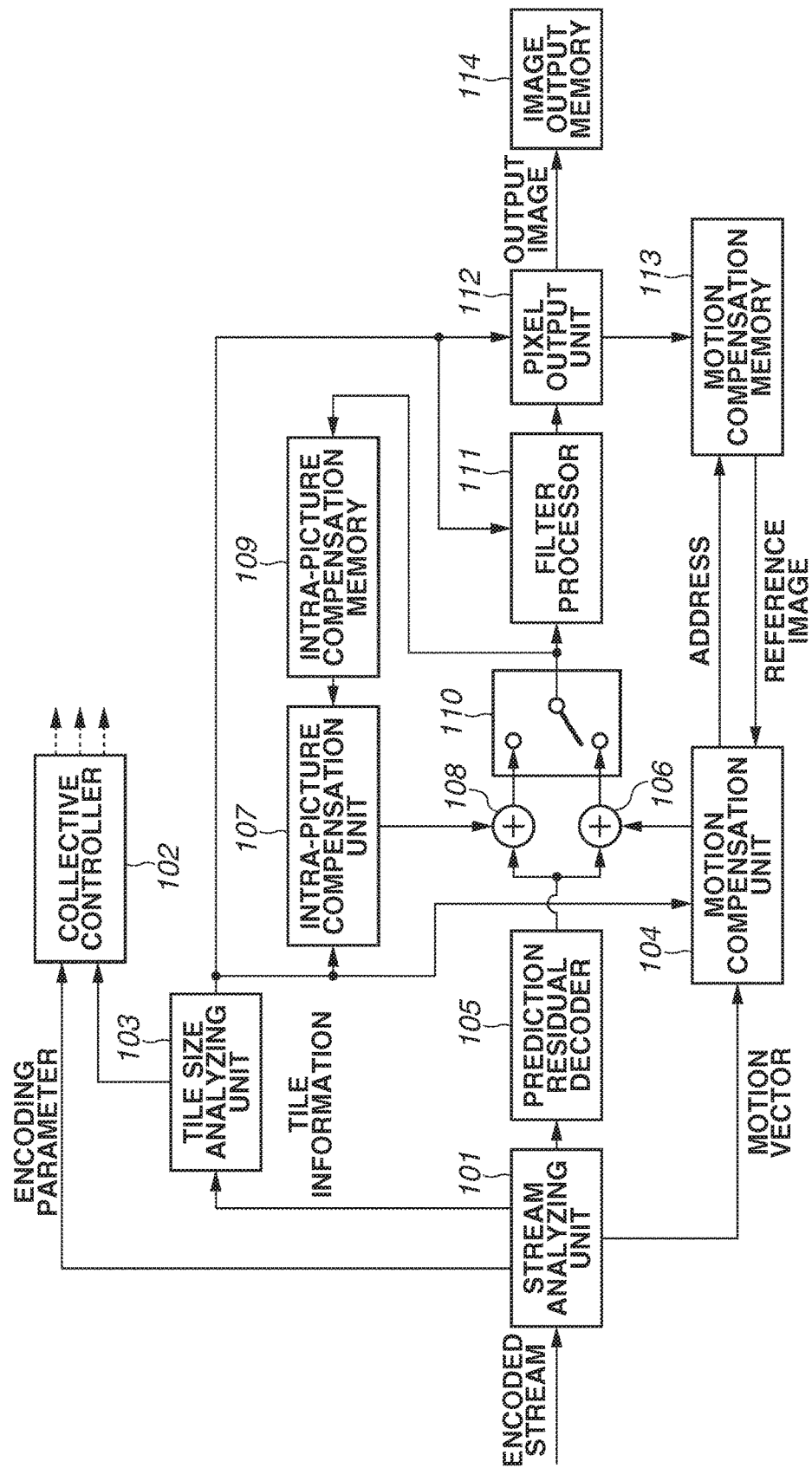
FIG. 1 is a block diagram illustrating an image decoding apparatus according to a first exemplary embodiment.

Various exemplary embodiments, features, and aspects of the invention will be described in detail below with reference to the drawings.

Example 1

In a first exemplary embodiment of the present invention, similarly to NPL 1, one frame is divided into tiles, which are a plurality of rectangular areas. If the tile division is performed, the number of horizontal pixels of the tile after the division can be configured to be smaller than the slices divided into slices in H.264. Therefore, it is possible to implement a more smooth parallel process of encoding and decoding and to reduce a capacity of on-chip memory (SRAM) which is mounted as a system LSI.

Figure 2:
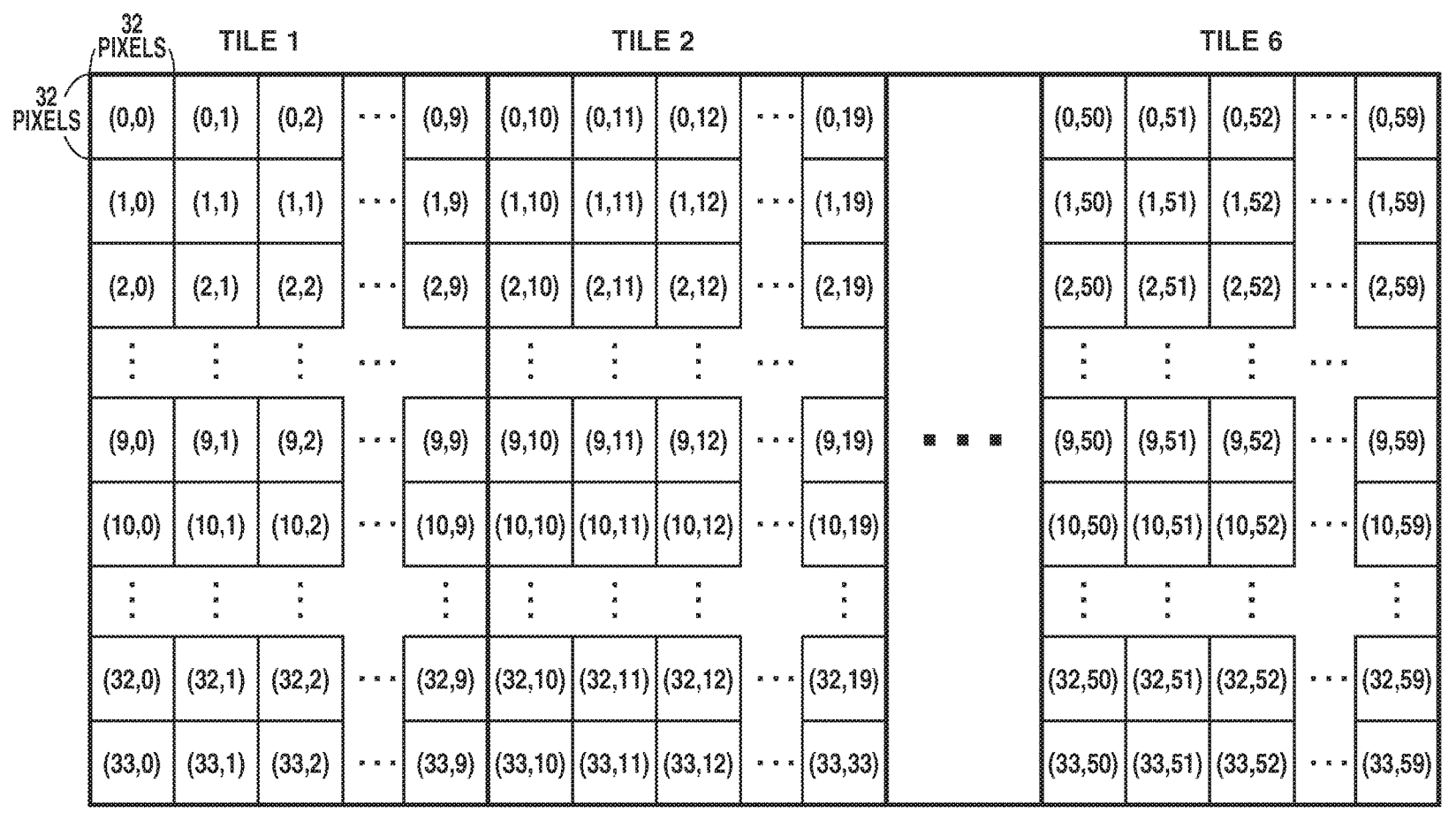

FIG. 2 illustrates a tile structure and a block according to the first exemplary embodiment. FIG. 2 illustrates a state where the frame of (horizontal 1920 pixels)×(vertical 1088 pixels) is divided into six tiles. Each tile size is a multiple of the block size, and in FIG. 2, each tile is configured with (horizontal 10)×(vertical 34) blocks. In FIG. 2, the numbers indicate space coordinates of each block in the frame.

In the encoding format according to the present invention, encoding is performed in units of a block, and the block is configured with (horizontal 32 pixels)×(vertical 32 pixels) (each tile includes (horizontal 320 pixels)×(vertical 1088 pixels)). In addition, in the present invention, the size of the block is not limited to (horizontal 32 pixels)×(vertical 32 pixels), and (horizontal 16 pixels)×(vertical 16 pixels) or (horizontal 64 pixels)×(vertical 64 pixels) may be used.

In the present exemplary embodiment, in the intra-picture prediction, the inter-frame prediction, and the filter process, each tile is encoded independently without reference to other tiles. During the decoding, each tile can be decoded independently without reference to other tiles. Since there is no dependency between tiles, the encoding and the decoding of a plurality of tiles can be performed in parallel.

The order of encoding and decoding in each tile is a raster scan order, and Tile 1 of FIG. 2 is decoded in the order of (0, 0)→(0, 1) to (0, 9)→(1, 0)→(1, 1) to (1, 9) to (33, 8)→(33, 9).

Figure 3:
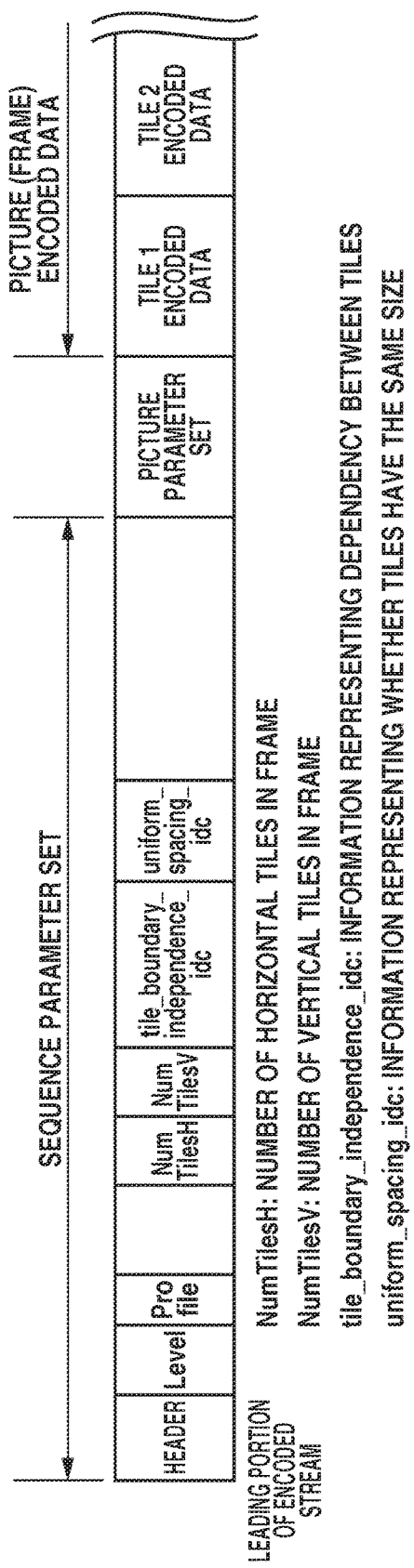
FIG. 3 is a diagram illustrating an example of an encoded stream according to the first exemplary embodiment.

FIG. 3 illustrates an example of an encoded stream (hereinafter, referred to as a stream) of an image including the divided tiles according to the first exemplary embodiment. In FIG. 3, a profile indicating a combination of decodable processes, a level indicating a range of decodable parameter values, the number of horizontal pixels and the number of vertical pixels of the frame, and the tile information can be inserted into sequence parameter set which is inserted at the leading portion of the stream.

As tile information, first, information of the number of horizontal tiles and the number of vertical tiles in a frame is inserted. In FIG. 3, the number of horizontal tiles and the number of vertical tiles are NumTilesH and NumTilesV, respectively, which correspond to num_tile_columns_minus1 and num_tile_rows_minus1 discussed in JCTVC-F335.doc Internet<http://phenix.int-evry.fr/jct/doc_end_user/documents/6_Torino/wg11/>). The num_tile_columns_minus1 and the num_tile_rows_minus1 are the numbers obtained by subtracting 1 from the number of horizontal tiles and the number of vertical tiles in a frame, respectively.

When the number of horizontal tiles or the number of vertical tiles is two or more (in the case of performing tile division), uniform_spacing_idc (discussed in JCTVC-F335.doc Internet<http://phenix.int-evry.fr/jct/doc_end_user/documents/6_Torino/wg11/>)) is subsequently inserted, which is information indicating whether sizes of the tiles are equal to each other. In the present exemplary embodiment, it is assumed that the sizes of tiles are equal to each other, and thus, uniform_spacing_idc=1. In addition, as described below in a third exemplary embodiment, the present invention can also be adapted to the case where uniform_spacing_idc=0.

Figure 4:
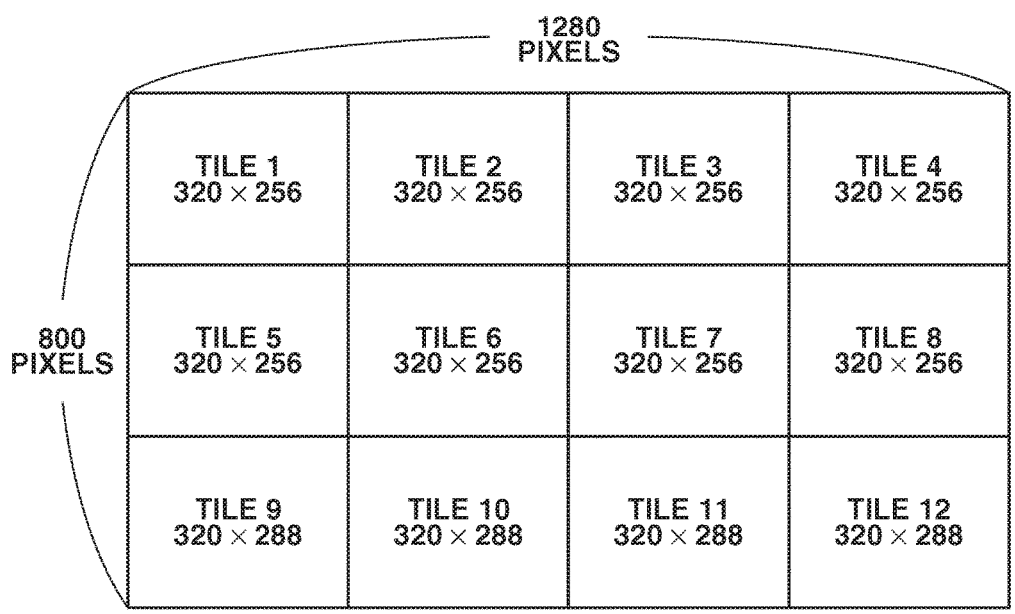
FIG. 4 is a diagram illustrating an example of tile division when tile sizes are different according to the first exemplary embodiment.

As discussed in JCTVC-F335.doc Internet<http://phenix.int-evry.fr/jct/doc_end_user/documents/6_Torino/wg11/>), when uniform_spacing_idc=1, the number of horizontal pixels and the number of vertical pixels of each tile can be obtained by division based on the number of horizontal pixels and the number of vertical pixels of a frame. In addition, even when uniform_spacing_idc=1, the sizes of tiles may be slightly different from each other according to a relationship between the size of frame and the number of tiles. FIG. 4 illustrates an example where the number of horizontal tiles is 4 and the number of vertical tiles is 3 with respect to a frame of (horizontal 1280 pixels)×(vertical 800 pixels).

In addition, in the present invention, the position of insertion of the tile information is not limited to the sequence parameter set, and the tile information may also be inserted, for example, as a portion of picture parameter set or slice header.

FIG. 1 is a block diagram illustrating an image decoding apparatus which decodes a stream according to an image encoding format. As illustrated in FIG. 1, the image decoding apparatus includes a stream analyzing unit 101, a collective controller 102, a tile size analyzing unit 103, a motion compensation unit 104, an prediction residual decoder 105, an adder 106, an intra-picture compensation unit 107, an adder 108, an intra-picture compensation memory 109, a selector 110, filter processor 111, a pixel output unit 112, a motion compensation memory 113, and an image output memory 114.

The stream analyzing unit 101 receives the encoded stream as an input and performs separation of header information including tile information, a motion vector, and an encoded prediction residual. The collective controller 102 receives the header information from the stream analyzing unit 101 and analyzes the level, the profile and various encoding modes and encoding parameters (motion prediction or intra-picture prediction and an intra-picture prediction mode).

The collective controller 102 performs control of each process according to the analyzed encoding mode and encoding parameters. The tile size analyzing unit 103 receives tile information such as the number of horizontal tiles and the number of vertical tiles from the stream analyzing unit 101, and performs calculation of the number of horizontal pixels and the number of vertical pixels of the tile. The calculated information such as the number of horizontal pixels and the number of vertical pixels and dependency between tiles is transmitted to each related process.

When the encoding mode of a decoding-object block is motion prediction, the motion compensation unit 104 generates an address with respect to the motion compensation memory 113, where a decoded image for motion prediction is recorded, according to the motion vector and the tile information.

The motion compensation unit 104 generates a reference block for motion compensation by using a reference image received from the motion compensation memory 113 (when the motion vector represents a non-integer value, filter processing or the like is performed).

In addition, in the present exemplary embodiment, it is presumed that the encoding is performed without reference of another tile (tile_boundary_independence_idc=1) as described above. When the pixel used for generation of the reference block is located outside the tile, replacement with a pre-defined pixel value is performed.

The prediction residual decoder 105 generates the prediction residual by performing entropy decoding (variable length decoding or arithmetic decoding), inverse-quantization, and inverse-orthogonal transformation on the encoded prediction residual. The adder 106 performs addition of the reference block output from the motion compensation unit 104 and the prediction residual decoded by the prediction residual decoder 105.

When the encoding mode of the decoding-object block is a block encoded through the intra-picture prediction, the intra-picture compensation unit 107 reads the pixels corresponding to the intra-picture prediction mode from the intra-picture compensation memory 109 and generates the reference block. In addition, the intra-picture compensation unit 107 also performs replacement of the pixels which are located outside the tile of which the tile information is referred to.

The adder 108 performs addition of the reference block output from the intra-picture compensation unit 107 and the prediction residual. The decoded pixels after the addition are recorded in the intra-picture compensation memory 109 for the intra-picture compensation of the following blocks.

The selector 110 selects the output of any one of the adder 106 and the adder 108 according to the encoding mode. The decoded pixels after the addition are recorded in the intra-picture compensation memory 109 for the intra-picture compensation of the following block. The filter processor 111 receives the output of the selector 110, and performs filter processing such as a de-blocking process. In addition, the filter processor 111 also performs replacement of the pixels which are located outside the tile with reference to the tile information.

The pixel output unit 112 calculates memory addresses with reference to the tile information and records the memory addresses in the motion compensation memory 113 and the image output memory 114.

In the present exemplary embodiment, during the decoding of the encoded stream, at the time when the decoding of the block located at (33, 9) in the configuration of FIG. 2 is completed and when the decoding of ⅙ of the entire frame is completed, the printing process of the left-side ⅙ of the frame can be started. As a result, the decoding process and the printing process for residual ⅚ of the frame can be performed in parallel, so that it is possible to greatly shorten the processing time of the moving picture frame printing.

In addition, the pixels of which the printing is completed need not be continuously stored in the memory, and thus, the portion of the memory can be used for recording the decoded pixels of the following tile. As a result, in the configuration of FIG. 2, since ⅙ of the image output memory is used for the decoding and ⅙ thereof is used for the printing process, the necessary memory size becomes ⅓ of the memory size in the related art (the memory capacity used for the decoding process such as motion compensation is excluded).

In general, in the image decoding apparatus, the stream which is encoded with the supported level and profile need to be decodable. However, the number of tiles in the frame and the tile size are determined during the encoding, the aforementioned effects of shortening the processing time and reducing the memory size of the moving picture frame printing apparatus depends on whether the tile division is used during the encoding.

In addition, even in the case of the tile-divided stream, when the number of pixels of each tile is not an appropriate value (for example, the case where the number of horizontal pixels of the tile is equal to the number of horizontal pixels of the frame), the aforementioned effects cannot be obtained. During the design of the system including an image decoding apparatus such as a printer, it is not accurately checked how large a memory size is needed, and thus, a memory capable of processing the entire frame is installed, so that there is an issue in that the cost is increased.

Therefore, in the encoding method of the present exemplary embodiment, a profile for the tile division is defined as a profile which is suitable for the moving picture frame printing apparatus and by which the memory size can be reduced. Herein, for the convenience, the profile is referred to as a printing profile. For example, similarly to the profile_idc indicating a profile of H.264, when a profile is set as a printing profile of 0x80, all the following conditions need to be satisfied.

In the following conditions, tile_info_present_flag (discussed in Non-Patent Literature 2) is information included in the header of the stream and indicating that information on a tile is included in the following header. column_width [i] and row_height [i] (described in JCTVC-F335.doc Internet<http://phenix.int-evry.fr/jct/doc_end_user/documents/6_Torino/wg11/>)) indicate the number of horizontal pixels and the number of vertical pixels of each tile, respectively, and are values determined by the number of horizontal pixels and the number of vertical pixels of a frame and the numbers of horizontal and vertical tiles. In addition, MaxTileWidth and MaxTileHeight indicate the maximum number of horizontal pixels and the maximum number of vertical pixels of each tile and values defined in advance according to the level.

tile_info_present_flag=1

(num_tile_columns_minus1>0)OR (num_tile_rows_minus1>0)

uniform_spacing_idc=1 column_width [$i$]≤MaxTileWidth row_height [$i$]≤MaxTileHeight

FIG. 5 illustrates an example of limitation in the tile size in a printing profile. The baseline profile at the left side is a profile in the related art where there is no limitation to the tile size, and any tile size can be used during the encoding without depending on the level. On the other hand, in the printing profile according to the present invention, as illustrated in FIG. 5, the number of horizontal pixels and the number of vertical pixels of the tile are limited to specific values according to the level.

In the image decoding apparatus which supports only the printing profile, the encoded stream of which size exceeds the maximum tile size is considered to be a stream which is not supported, and the decoding thereof is unnecessary. Therefore, it is possible to reduce the mounted maximum memory capacity of the image decoding apparatus down to a certain amount or less.

When the image decoding apparatus of FIG. 1 is to implement the above configuration, if there is a printing profile and the calculated tile size exceeds the maximum tile size, the collective controller 102 notifies to the outside that the stream is not supported and stops the decoding process.

The present invention is not limited to the configuration described above, and the maximum number of horizontal pixels and the maximum number of vertical pixels of each tile in the printing profile can be defined as arbitrary values.

In addition, the present invention is not limited to a combination of a specific profile and a specific level, and the maximum number of horizontal pixels and the maximum number of vertical pixels may be defined by using, for example, only the profile. In addition, the limitation in the tile size can be adapted to any one of the number of horizontal pixels and the number of vertical pixels of the tile.

In the image decoding apparatus such as a printer which limits the supported stream to the printing profile where the tile size is limited, it is possible to check the necessary memory size (maximum use memory size) at the time of design of the apparatus and to reduce the memory cost. In addition, it is possible to shorten a processing time of the moving picture frame printing apparatus with respect to the stream encoded by the printing profile.

In addition, the division number of tile and the like are not limited thereto, and the name of the profile and the value indicating the profile are not also limited thereto.

Particularly, in moving picture frame printing, by allowing the number of vertical pixels of the tile to be equal to the number of vertical pixels of the frame, it is possible to implement a higher speed process.

Therefore, in order to implement a higher speed process, a high printing profile where the number of vertical pixels of the tile is limited to be equal to the number of vertical pixels of the frame may be provided. In the high printing profile, the maximum number of vertical pixels of the tile is limited to be equal to the maximum number of vertical pixels of the frame.

In addition, each tile is basically multiplexed into the stream in a raster scan order (in FIGS. 2 and 4, the order of Tile 1→Tile 2→Tile 3). However, in the present invention, the column of tiles of the left end of the frame can be multiplexed with priority to be closer to the processing order of the printing. In this case, in FIG. 4, the multiplexing is performed in the order of Tile Tile 5→Tile 9→Tile 2. In addition, the processing order of tile may be included in the header.

In this manner, by setting the order of multiplexing between tiles to the order close to the printing process, it is possible to implement higher speed moving picture frame printing.

Example 2

In the encoding format according to a second exemplary embodiment of the present invention, the decoding of the encoded stream may be embodied by a software program on a CPU. FIGS. 6 and 7 illustrate flowcharts of a program of decoding one frame. In addition, with respect to the format of the encoded stream and the tile division, the same configurations as those of the first exemplary embodiment are used.

First, in step S601, the header information in the encoded stream is analyzed, and the level, the profile, and the tile information (the number of tiles, dependency between tiles, the equality between tiles in size, and the like) are extracted. In step S602, the tile size of each tile is determined from the tile information obtained in step S601. In addition, the total number of tiles included in the frame is calculated.

In step S603, it is determined whether the profile is a printing profile. When the profile is a printing profile (YES in step S603), the processing proceeds to step S604 to check the tile size. On the other hand, when the profile is a profile other than the printing profile (NO in step S603), it is notified that, since the profile is not supported, the stream cannot be decoded, and the processing is ended.

In step S604, MaxTileWidth and MaxTileHeight, which are respectively the maximum number of horizontal pixels and the maximum number of vertical pixels of each tile defined according to the level of the printing profile extracted in step S601, are calculated. In steps S605 and S606, it is checked that the number of horizontal pixels and the number of vertical pixels of each tile is equal to or smaller than the maximum number calculated in step S604. When any one thereof exceeds the maximum number (NO in step S605 or S606), it is notified that the stream cannot be decoded, and the processing is ended.

In steps S607 and S608, the decoding process is repetitively performed on all the tiles in the frame. When the encoded stream is configured with a plurality of image frames, steps S601 to S608 are repeated up to the last frame.

FIG. 7 illustrates a flowchart of a decoding process of each tile. In step S701, the encoding mode and the encoding parameter of the decoding target block are extracted from the header information of each block. In step S702, the entropy decoding (variable length decoding or arithmetic decoding), the inverse-quantization, and the inverse-transformation process are performed to decode the prediction residual.

In step S703, the encoding mode of the decoding target block extracted in step S701 is determined, and it is determined whether the encoding is performed in the motion prediction mode or in the intra-picture prediction mode. If the decoding is determined to be performed in the motion prediction mode (YES in step S703), the processing proceeds to step S704. On the other hand, if the decoding is not determined to be performed in the motion prediction mode (NO in step S703), the processing proceeds to step S706.

In step S704, the motion vector for performing the motion compensation is extracted from the encoded stream and is decoded. In step S705, as a motion compensation process, generation of the reference block for the motion compensation and addition of the reference block to the prediction error are performed by using the motion vector generated in step S704.

Similar to the first exemplary embodiment, replacement of the reference pixel which is located outside the tile is performed with reference to the tile size analyzed in step S602.

In step S706, intra-picture compensation is performed according to the intra-picture prediction mode extracted in step S701. Similar to the first exemplary embodiment, replacement of the pixels which are located outside the tile is performed.

In step S707, filter processing such as de-blocking filtering is performed on the decoded block which is subjected to the motion compensation or the intra-picture compensation. Similar to the first exemplary embodiment, replacement of the pixels which are located outside the tile is performed.

In step S708, when the decoding process of all the blocks in the tile is not completed (NO in step S708), the processing returns to step S701, and when the decoding process of all the blocks is completed (YES in step S708), the decoding of the tile is ended. In addition, similar to the first exemplary embodiment, in the second exemplary embodiment, the tile size and the division number of tiles are not limited thereto.

When the image decoding process is embodied by a program described above, it is possible to obtain the effects equivalent to those of the first exemplary embodiment by the software.

In addition, in the present exemplary embodiment, when the profile is not a printing profile, the processing is ended. However, the present exemplary embodiment is not limited thereto, and the decoding can also be performed by increasing memory allocation of the decoding process. However, in this case, the effect of a high speed process disappears.

Example 3

In the encoding format according to a third exemplary embodiment of the present invention, the tile division and the maximum tile size which are different from those of the first exemplary embodiment are used. By limiting the total number of pixels, it is possible to obtain the same effect of reducing the memory size as that of the first exemplary embodiment in a more flexible type.

FIG. 8 illustrates an example of an encoded stream including tile division according to the third exemplary embodiment. In the third exemplary embodiment, since different tile sizes are used for different tiles, uniform_spacing_idc is set to 0. The number of horizontal pixels (column_width [i]) of the tile corresponding to the number of horizontal tiles and the number of vertical pixels (row_height [i]) of the tile corresponding to the number of vertical tiles are inserted after the uniform_spacing_idc. FIG. 9 illustrates an example of the tile division according to the third exemplary embodiment (in the example, the number of horizontal tiles is 3 and the number of vertical tiles is 3).

In the third exemplary embodiment, a product of the number of horizontal pixels and the number of vertical pixels, that is, the total number of pixels in the tile is configured to be limited. Therefore, in the present exemplary embodiment, when the value indicates that the profile is a printing profile, for example, the profile_idc used in H.264 is 0x80, all the following conditions needs to be satisfied. In the following conditions, MaxTileSize is the total maximum number of pixels in the tile and is defined according to the level. The other variables indicate the same contents as those of the first exemplary embodiment.

tile_info_present_flag=1

(num_tile_columns_minus 1>0)OR (num_tile_rows_minus 1>0)

uniform_spacing_idc=0 column_width [i]×row_height [i]≤MaxTileSize

As an example, when the profile in the encoded stream is a printing profile, the total number of pixels in the tile MaxTileSize is limited according to the table illustrated in FIG. 10.

The decoding apparatus has the same configuration as that of the first exemplary embodiment.

In this manner, although the tile size is limited to the total number of pixels of the tile, the same effects as those of the first exemplary embodiment can be obtained.

In addition, by performing the encoding with reference to other tiles (tile_boundary_independence_idc=0), the parallelism of the encoding and decoding processes are slightly lowered, but deterioration in image quality at the tile boundary can be suppressed.

In addition, similar to the second exemplary embodiment, the configuration of the present exemplary embodiment can be embodied by a software program. In the present exemplary embodiment, MaxTileSize is calculated in step S604, and the condition of step S605 is replaced with column_width [i]×row_height [i]≤MaxTileSize.

Example 4

In a fourth exemplary embodiment according to the present invention, the encoded stream has a format where the tile information can be omitted (tile_info_present_flag=0). When the encoded stream is a printing profile, although tile_info_present_flag=0, the tile division is automatically performed.

In the fourth exemplary embodiment, as illustrated in the tables of FIGS. 11A and 11B, the number of horizontal pixels and the number of vertical pixels of the maximum tile which is a limitation value of each level or the total maximum number of pixels of the tile are used as the tile size. FIG. 12 illustrates an example of the tile division according to the present exemplary embodiment. In addition, the image decoding apparatus has the same configuration as that of the first exemplary embodiment.

FIG. 11A illustrates an example where the number of horizontal pixels and the number of vertical pixels of the maximum tile which is a limitation value of the tile are used as the tile size. FIG. 12A illustrates an example of the tile division corresponding to Level 2 (middle level) of FIG. 11A.

In addition, in the present exemplary embodiment, as illustrated in the table of FIG. 11B, the total maximum number of pixels in the tile can be used as the limitation value of each level. In this case, the number of horizontal pixels and the number of vertical pixels of each tile is determined according to the aspect ratio of the tile which is defined in advance according to the profile and the level.

FIG. 12B illustrates the tile division when horizontal 1:vertical 3 is used as the aspect ratio of the tile corresponding to Level 2 (middle level) of the printing profile of FIG. 11B.

In addition, the aspect ratio of the tile which is defined in advance is not limited thereto, and any aspect ratio such as horizontal 4:vertical 3 or horizontal 1:vertical 1 can be used. In addition, in the case of using a high printing profile, since the number of vertical pixels of the tile is limited to the value equal to the number of vertical pixels of the frame, the value obtained by dividing the total maximum number of pixels in the tile by the number of vertical pixels of the frame becomes the number of horizontal pixels of the tile.

FIG. 12B illustrates the tile division corresponding to Level 2 (middle level) of the high printing profile of FIG. 11B. In addition, the number of horizontal pixels and the number of vertical pixels of the tile using the total maximum number of pixels in the tile are calculated under the condition that the limitation the tile size is a multiple of the block size (in the present exemplary embodiment, (horizontal 32 pixels)×(vertical 32 pixels)) is satisfied.

When the encoded stream is a printing profile and the tile information is omitted (tile_info_present_flag=0), basically, all the tiles are configured to have the same size. However, as illustrated in FIGS. 12A, 12B, and 12C, the tile size in the end of the frame may be smaller than those of the other tiles.

In this manner, when the tile information is omitted in the stream, the tile division is automatically performed by using the maximum tile size, so that it is possible to implement a high speed process and to reduce memory cost by simply performing the tile division. In addition, due to the maximum tile size which is defined with respect to the printing profile and the tile size which is calculated from the encoded stream, risk of occurrence of contradictory streams is reduced, so that it is possible to obtain an effect of increasing interoperability between apparatuses relating to the encoding and the decoding.

In addition, the aspect ratio may be included in the stream as a portion of the header information such as sequence parameter set. If the aspect ratio is included in the stream, the amount of the header information and the processing amount of the analysis process are increased, but the effect where various aspect ratios can be used during the encoding can be obtained.

In addition, similar to the second exemplary embodiment, the configuration of the present exemplary embodiment can be embodied by a software program. In this case, step S605 is always passed as normal.

In addition, in the present exemplary embodiment, when the aspect ratio is included in the stream, step S601 can be replaced with analyzing the aspect ratio, and step S604 can be replaced with determining the tile size by using the total maximum number of pixels and the aspect ratio.

Example 5

Similar to the fourth exemplary embodiment, in a fifth exemplary embodiment according to the present invention, the encoded stream has a format where the tile information can be omitted (tile_info_present_flag=0). When the encoded stream is a printing profile, although tile_info_present_flag=0, the tile division is automatically performed.

As illustrated in the table of FIG. 13, the default value of the tile size is used according to the level (½ of the number of horizontal pixels and the number of vertical pixels of the tile of each level is used as a default value). In addition, the image decoding apparatus has the same configuration as that of the first exemplary embodiment.

In addition, as described in the fourth exemplary embodiment, the default total number of pixels in the tile may be used as the limitation value of each level. Similar to the fourth exemplary embodiment, the number of horizontal pixels and the number of vertical pixels of each tile is determined according to the default total number of pixels in the tile and the aspect ratio of the tile which is defined in advance.

Figure 14:
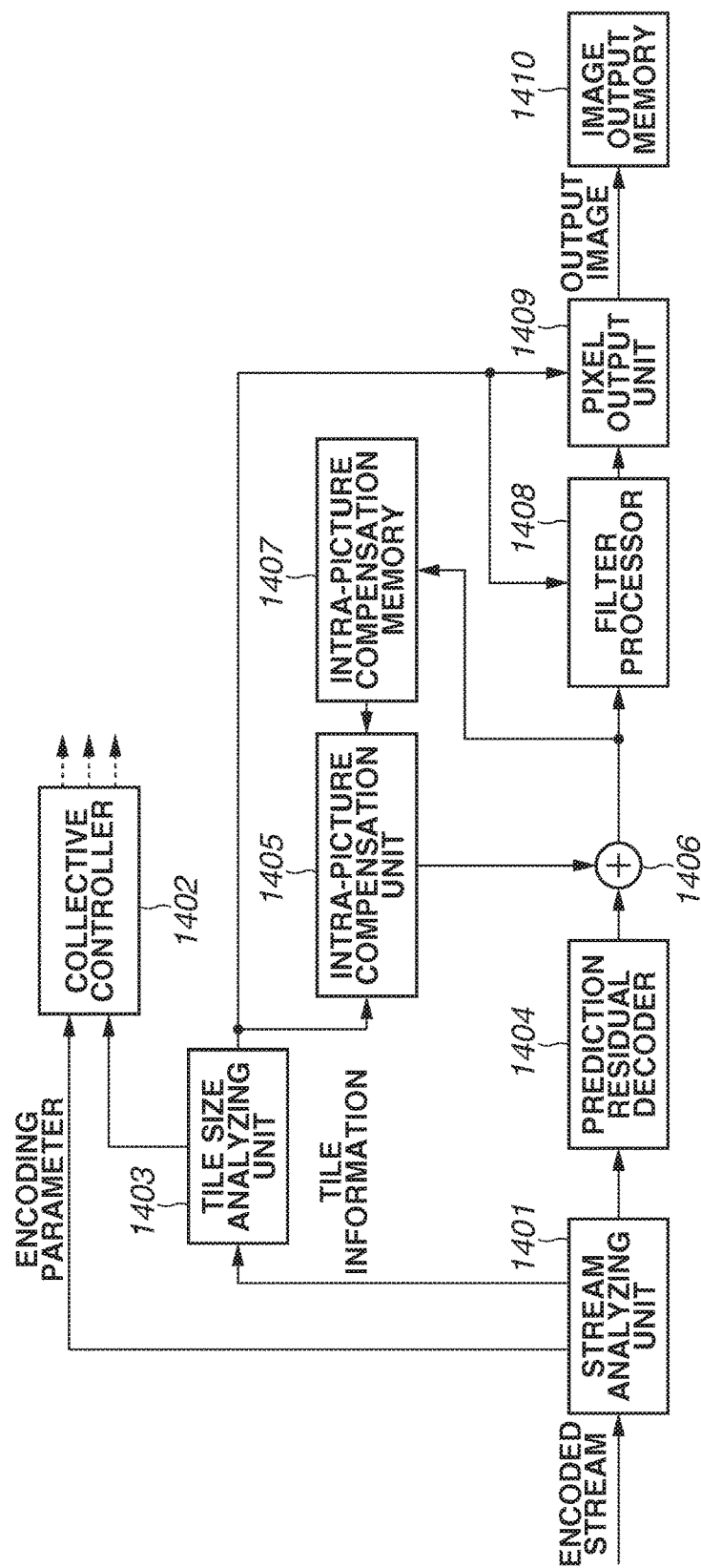
FIG. 14 is a block diagram illustrating an image decoding apparatus according to the fifth exemplary embodiment.

The present invention is not limited to the encoding method using the inter-frame prediction, and it may also be adapted to an image decoding apparatus which supports only the stream using only the intra-picture prediction as illustrated in FIG. 14.

In FIG. 14, the image decoding apparatus includes a stream analyzing unit 1401, a collective controller 1402, a tile size analyzing unit 1403, a prediction residual decoder 1404, an intra-picture compensation unit 1405, an adder 1406, an intra-picture compensation memory 1407, filter processor 1408, an image output unit 1409, and an image output memory 1410. Each process performs the same operation as that of the process having the same name in FIG. 1 (for example, the adder 1406 performs the same operation as that of the adder 108).

In this manner, when the tile information is omitted in the stream, the default tile size is used, so that in comparison with the fourth exemplary embodiment, it is possible to further reduce the necessary memory size by using a smaller tile size. In addition, similar to the fourth exemplary embodiment, it is possible to obtain the effect of increasing interoperability between apparatuses relating to the encoding and the decoding.

In addition, since the decoding object is only the stream which is encoded using only the intra-picture encoding, the memory for the motion compensation memory is unnecessary, so that it is possible to further reduce the memory cost. The encoding format using only the intra-picture encoding can be applied to a still image.

In addition, similar to the second exemplary embodiment, the configuration of the present exemplary embodiment can be embodied by a software program. In the present exemplary embodiment, the number of horizontal pixels and the number of vertical pixels of the tile are calculated according to the default value in step S604 of FIG. 6. In addition, step S605 is always passed as normal. In addition, steps S703, S704, and S705 of FIG. 7 are unnecessary.

In addition, in the encoding format according to the present invention, the number of tiles or the tile division is not limited to the configurations of the first to fifth exemplary embodiments. FIG. 15 illustrates a table of combination of the limitation of the tile sizes which can be implemented in the present invention. The types 1 to 4 are different types of the printing profiles. In addition, with respect to the profile of each type, a high printing profile can be defined, where the number of vertical pixels of the tile described in the first exemplary embodiment is equal to the number of vertical pixels of the frame.

With respect to each type of the high printing profile and the printing profile, all the profiles of which dependency between tiles is present or absent (tile_boundary_independence_idc=0 or 1, respectively) can be used.

Example 6

Figure 16:
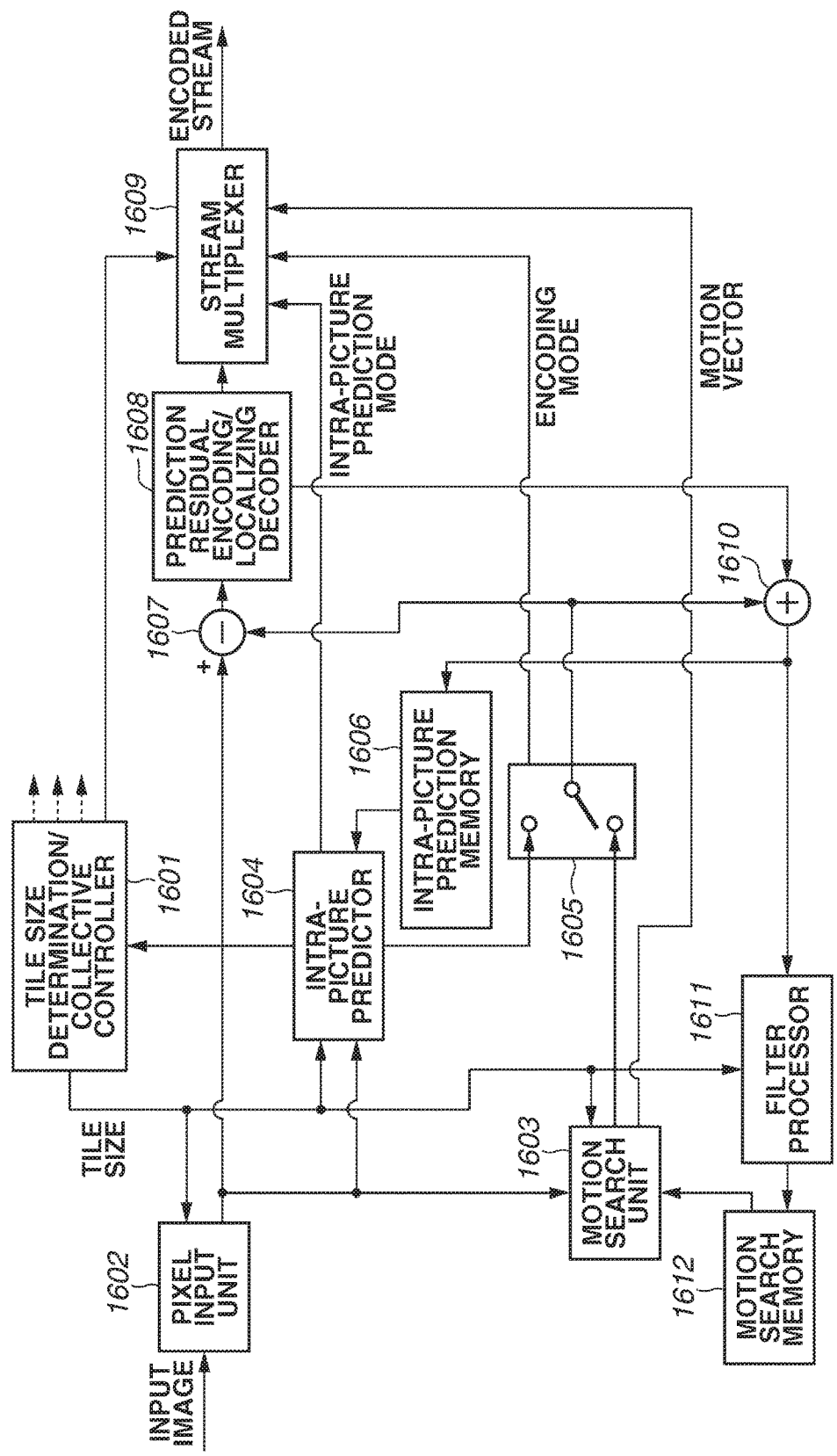
FIG. 16 is a block diagram illustrating an image encoding apparatus according to a sixth exemplary embodiment.

FIG. 16 is a block diagram illustrating an image encoding apparatus of encoding an image frame using the image encoding format according to a sixth exemplary embodiment of the present invention.

As illustrated in FIG. 16, the image encoding apparatus includes a tile size determination/collective controller 1601, a pixel input unit 1602, a motion search unit 1603, an intra-picture predictor 1604, a selector 1605, an intra-picture prediction memory 1606, a subtractor 1607, a prediction residual encoding/local decoder 1608, a stream multiplexer 1609, an adder 1610, filter processor 1611, and a motion search memory 1612.

In the tile size determination and collective control unit 1601, the level to be used together with the frame size to be used and the number of tiles to be used together with the profile to be used are set from an external portion of the image encoding apparatus. When the profile is a printing profile, similar to the first to third exemplary embodiments, the number of tiles needs to be set so that the size does not exceed the maximum tile size (the number of vertical pixels and the number of horizontal pixels or the number of pixels in the tile) which is defined in advance according to the level.

In addition, although the tile size can be directly set from the outside of the image encoding apparatus, the tile size needs to be set so as not to exceed the maximum tile size. In addition, as described above, when the tile size is directly set, the uniform_spacing_idc needs to be set to 0.

The determined level, profile, and tile information are transmitted to the relating processes and, as a part of the header information, is multiplexed into the stream by the stream multiplexer 1609. The pixel input unit 1602 reads the input image according to the tile size.

The motion search unit 1603 reads the reference image from the motion search memory 1612, generates the reference block, and searches for an optimal motion vector to determine a motion vector which is estimated to have the smallest generated coding amount. In addition, similar to the first exemplary embodiment, when the pixel to be used for generation of the reference block is located outside the tile, replacement with a pre-defined pixel value is performed.

The intra-picture predictor 1604 reads the reference image from the intra-picture prediction memory 1606, generates the reference block corresponding to the intra-picture prediction mode, and searches for an optimal intra-picture prediction mode to determine an intra-picture prediction mode which is estimated to have the smallest generated coding amount.

The selector 1605 compares the estimated coding amounts calculated by the intra-picture predictor 1604 and the motion search unit 1603 to determine the encoding mode indicating the motion prediction or the intra-picture prediction and selects any one of reference blocks of the motion search unit 1603 or the intra-picture predictor 1604. In addition, with respect to the encoding mode, the encoding may be performed through the entropy encoding.

The subtractor 1607 for the encoding performs prediction (subtraction) of the input block and the reference block. The prediction residual encoding/localizing decordor 1608 performs the orthogonal transformation, the quantization, and the entropy encoding (variable length encoding or arithmetic encoding) on the prediction residual which is output from the subtractor 1607.

Simultaneously, the prediction residual encoding/local decoder 1608 performs the inverse-quantization and the inverse-orthogonal transformation with the quantization orthogonal transformation coefficient of prediction error for the intra-picture prediction or the motion prediction of the following block to perform local decoding of the prediction error. The stream multiplexer 1609 multiplexes the encoded data of the prediction error, the encoding mode, the motion vector, and the header information to output the encoded stream.

The adder 1610 performs addition (motion compensation or intra-picture compensation) of the prediction error locally decoded by the prediction residual encoding/local decoder 1608 and the reference block output from the selector 1605. The pixels decoded by the adder 1610 are output to the filter processor 1611 and are recorded in the intra-picture prediction memory 1606 for intra-picture prediction of the following block.

The filter processor 1611 applies filter processing such as de-blocking and filtering to the decoded block. The filter-processed decoded image is recorded in the motion search memory 1612.

The image encoding apparatus according to the present invention is not limited to a specific number of tiles or a specific tile size. The image encoding apparatus can also generate an encoded stream according to all the types of the printing profiles and the high printing profiles illustrated in FIG. 15.

In addition, the image encoding apparatus according to the present invention is not limited in a dependency between tiles (tile_boundary_independence_idc). With respect to all the types of the printing profiles, in order to avoid deterioration in image quality at the tile boundary, the encoding may be performed with inter-pixel dependency between tiles, and in order to further improve the parallelism in the encoding, the encoding may be performed without dependency between tiles.

In FIG. 16, the motion search unit 1603, the intra-picture predictor 1604, and the filter processor 1611 perform the encoding processing by taking into consideration the dependency between tiles.

The number of used tiles and the sizes of used tiles are not limited to specific values. In addition, while the tile division is performed with the maximum tile size or the default tile size like the fourth and fifth exemplary embodiments, the encoding may be performed with the header not including tile information (tile_info_present_flag=0). In addition, as described in the fifth exemplary embodiment, the above configuration can be applied to the image encoding apparatus which performs encoding by only the intra-picture prediction.

As described above, the tile size is limited according to the profile during the encoding, so that it is possible to generate the stream that can be decoded by a low-cost decoding apparatus which is limited to the printing profile or the high printing profile. In addition, it is possible to obtain an effect in that the stream is shorter than the processing time during printing of a moving picture frame printing apparatus.

Example 7

Figure 17:
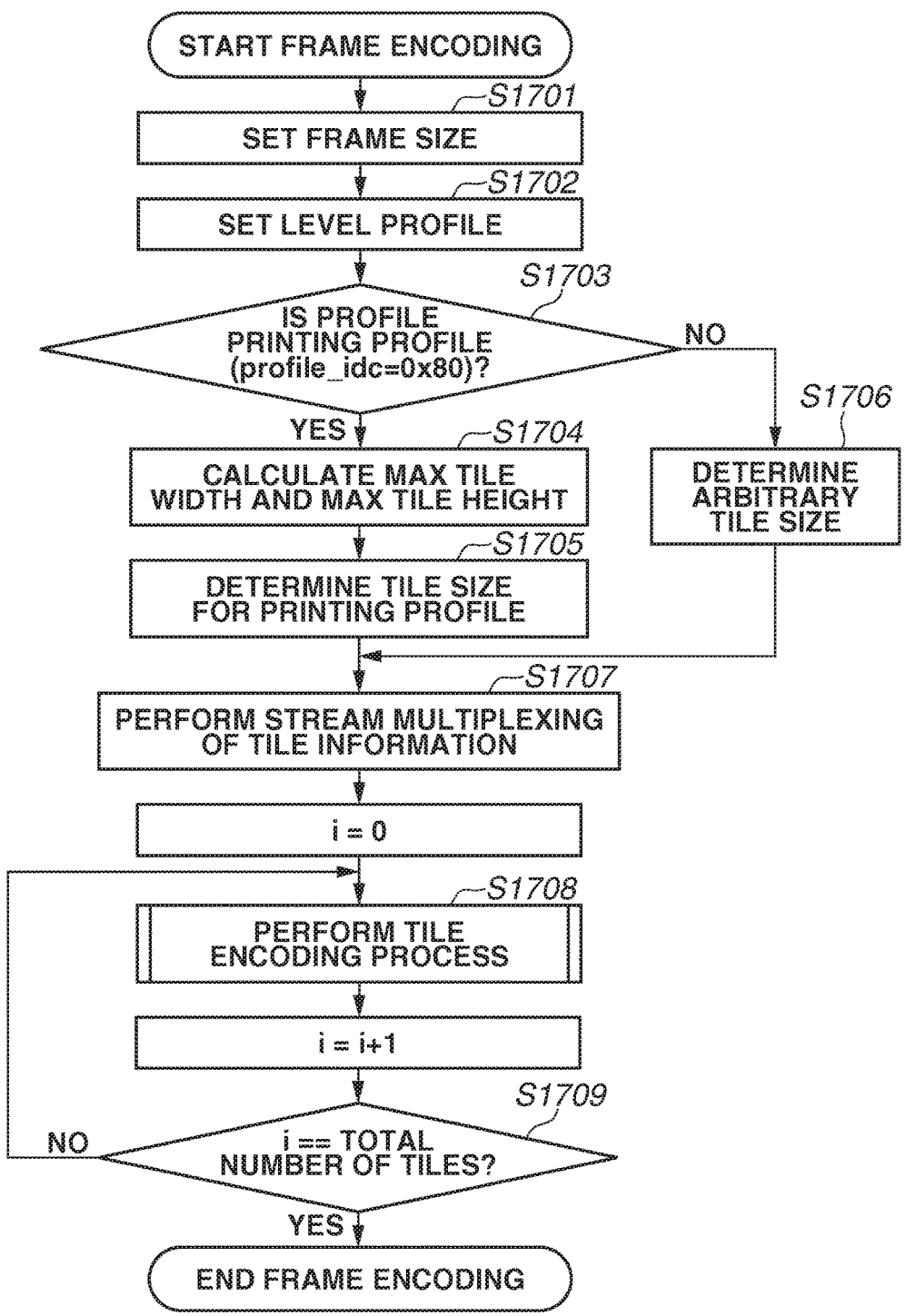
FIG. 17 is a flowchart illustrating encoding of each frame according to a seventh exemplary embodiment.
Figure 18:
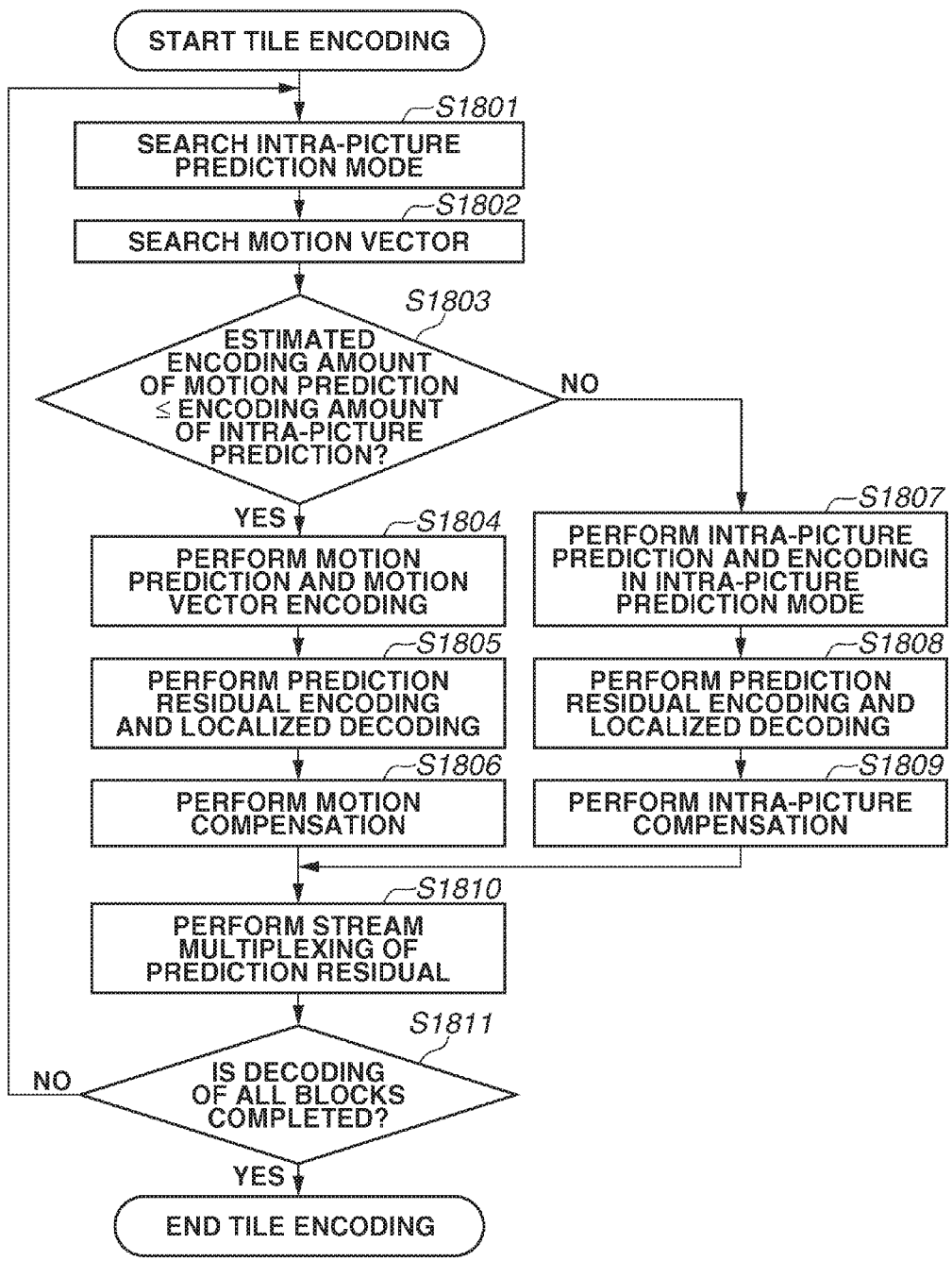
FIG. 18 is a flowchart illustrating encoding of each tile according to the seventh exemplary embodiment.
Figure 19A:
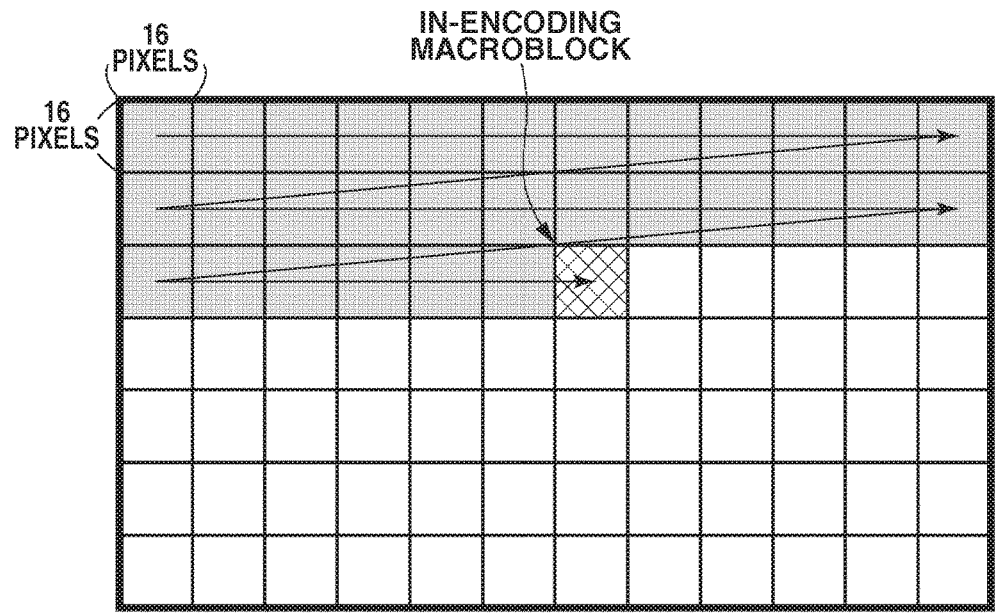
FIGS. 19A and 19B are diagrams illustrating a process sequence of encoding and decoding and a multi-slice structure in H.264.
Figure 19B:
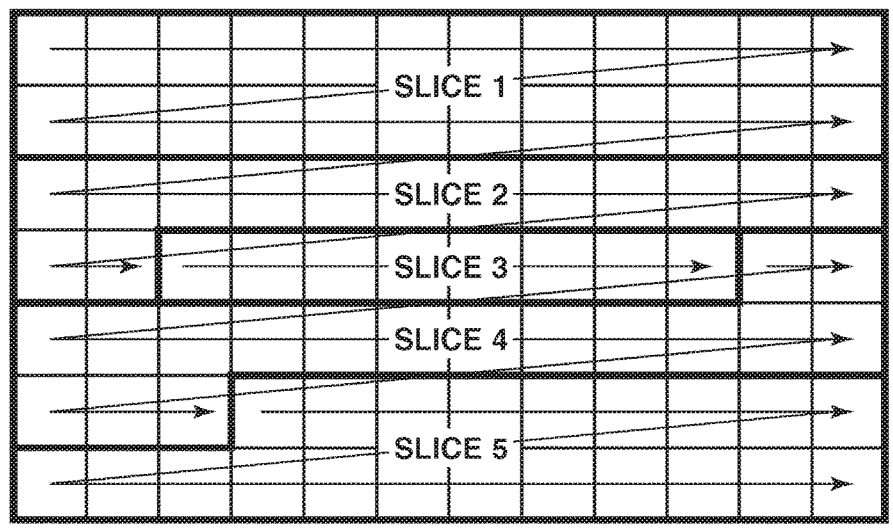

The image encoding apparatus according to the sixth exemplary embodiment may be realized as a software program on a CPU. FIGS. 17 and 18 illustrate flowcharts of a program of encoding one frame according to a seventh exemplary embodiment.

First, in step S1701, a frame size to be used is set from an external portion of the program. In step S1702, the level and profile to be used are set from the outside of the program.

In step S1703, when the profile is a printing profile (YES in step S1703), the processing proceeds to step S1704. When the profile is the other profiles (NO in step S1703), the processing proceeds to step S1706. In step S1704, the maximum number of horizontal pixels and the maximum number of vertical pixels of the tile, which are defined in advance according to the level, are calculated.

In step S1705, the number of horizontal tiles and the number of vertical tiles are determined so that the tile size is in a range of the maximum number of horizontal pixels and the maximum number of vertical pixels calculated in step S1704, and the tile size of each tile is calculated. In addition, similar to the six exemplary embodiment, the tile size may be directly set from the outside (in this case, uniform_spacing_idc needs to be set to 0).

In step S1706, the arbitrary number of tiles and arbitrary tile size are used in a range smaller than the frame size. The tile division may not be performed by setting the number of horizontal tiles=1 and the number of vertical tiles=1. In step S1707, the determined tile information is multiplexed into the encoded stream. In steps S1708 and S1709, encoding is performed on all the tiles in the frame.

FIG. 18 illustrates a flowchart of an encoding process of each tile. In step S1801, searching of the intra-picture prediction mode of each block is performed to estimate a generated coding amount from a prediction residual. In step S1802, searching of the motion vector of each block in a tile is performed to estimate a generated coding amount from the prediction residual. In addition, when the processing-object frame is an intra-picture encoded frame, this step is not performed.

In step S1803, the estimated coding amount of the motion prediction and the estimated coding amount of the intra-picture prediction are compared, and the motion prediction after step S1804 or the intra-picture prediction performed in step S1807 and after is performed according to the encoding mode which is a result of the comparison.

In step S1804, the motion prediction is performed by using the motion vector found in step S1802. In addition, the information indicating that the encoding mode is the motion prediction mode is encoded, the found motion vector is encoded, and multiplexing into the encoded stream is performed.

In step S1805, similar to the prediction residual encoding/local decoder 1608 according to the present exemplary embodiment, the generation of the encoded data and the local decoding of the prediction residual are performed. In step S1806, the motion compensation is performed on the locally decoded prediction residual.

In step S1807, the intra-picture prediction is performed by using the intra-picture prediction mode found in step S1801. In addition, the information indicating that the found encoding mode is the intra-picture prediction mode and the intra-picture prediction mode are encoded, and multiplexing into the encoded stream is performed.

In step S1808, similar to step S1805, the generation of the encoded data and the local decoding of the prediction residual are performed. In step S1809, the intra-picture compensation is performed on the locally decoded prediction residual. In step S1810, multiplexing of the encoded prediction residual into the encoded stream is performed.

At this time, the motion vector or the intra-picture encoding mode is also multiplexed into the encoded stream. In step S1811, if it is determined that the encoding of all the blocks in the tile is completed, the encoding of the tile is completed.

Similar to the sixth exemplary embodiment, the present exemplary embodiment is not limited to a specific number of tiles and a specific size of tile. The present exemplary embodiment can be used for any combination of tile_info_present_flag, tile_boundary_independence_idc, and uniform_spacing_idc. As described above, even when the image encoding process is realized as a program, the effects equivalent to those of the sixth exemplary embodiment can be obtained.

In addition, although an example where one frame is designated from a moving image and is printed out is described, the present invention is not limited thereto. For example, the present invention is effectively adapted to a method of combining a still image from a plurality of frames.

The present invention can be achieved by supplying a storage medium on which a computer program code for implementing the aforementioned functions is recorded to a system and allowing the system to read and execute the computer program code. In this case, the computer program code read from the storage medium implements the functions of the aforementioned exemplary embodiments, and the storage medium storing the computer program code is included in the present invention. In addition, the case where an operating system (OS) operating on a computer executes a portion or the entire portions of actual processes based on commands of the program code and the aforementioned functions are implemented by the processes is also included in the present invention.

In addition, the present invention may be implemented in the following forms. That is, the computer program code read from the storage medium is written in a memory included in a function extension card inserted into a computer or a function extension unit connected to the computer. In addition, the case where a central processing unit (CPU) or the like installed in the function extension card or the function extension unit executes a portion of or the entire portions of actual processes based on commands of the computer program code and the aforementioned functions are implemented by the processes is also included in the present invention.

When the present invention is applied to the aforementioned storage medium, the computer program codes corresponding to the flowcharts described above are stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image encoding apparatus configured to encode one or more image frames, the image encoding apparatus comprising:
   a processor; and
   a memory in communication with the processor for storing computer-executable instructions that, when executed by the processor, perform operations comprising:
   acquiring information so that a decoding process is able to be performed by an image decoding apparatus;
   determining a size of a rectangular tile having a plurality of blocks according to the acquired information, the rectangular tile being a unit of processing in which an intra-picture prediction process in at least one of the plurality of blocks is independently performed without reference to other rectangular tiles; and
   dividing each of the one or more image frames into rectangular tiles according to the determined size of rectangular tiles, and encoding the one or more image frames by performing the intra-picture prediction process in at least one of the plurality of blocks independently without reference to other rectangular tiles.

2. An encoding method for an image encoding apparatus configured to encode one or more image frames, the method comprising:
   acquiring information so that a decoding process is able to be performed by an image decoding apparatus;
   determining a size of a rectangular tile having a plurality of blocks according to the acquired information, the rectangular tile being a unit of processing in which an intra-picture prediction process in at least one of the plurality of blocks is independently performed without reference to other rectangular tiles; and
   dividing each of the one or more image frames into rectangular tiles according to the size of rectangular tiles and encoding the one or more image frames by performing the intra-picture prediction process in the at least one of the plurality of blocks independently without reference to other rectangular tiles.

3. A non-transitory computer-readable medium causing a computer to execute an encoding method for an image encoding apparatus configured to encode one or more image frames, the method comprising:
   acquiring information so that a decoding process is able to be performed by an image decoding apparatus;
   determining a size of a rectangular tile according to the acquired information, the rectangular tile being a unit of processing in which an intra-picture prediction process in at least one of the plurality of blocks is independently performed without reference to other rectangular tiles; and
   dividing each of the one or more image frames into rectangular tiles according to the size of rectangular tiles and encoding the one or more image frames by performing the intra-picture prediction process in at least one of the plurality of blocks independently without reference to other rectangular tiles.

* * * * *